(12) United States Patent
Samarasekera et al.

(10) Patent No.: US 9,476,730 B2
(45) Date of Patent: Oct. 25, 2016

(54) REAL-TIME SYSTEM FOR MULTI-MODAL 3D GEOSPATIAL MAPPING, OBJECT RECOGNITION, SCENE ANNOTATION AND ANALYTICS

(71) Applicant: SRI International, Menlo Park, CA (US)

(72) Inventors: Supun Samarasekera, Princeton, NJ (US); Raia Hadsell, Princeton Junction, NJ (US); Rakesh Kumar, West Windsor, NJ (US); Harpreet S. Sawhney, Princeton Junction, NJ (US); Bogdan C. Matei, Princeton Junction, NJ (US); Ryan Villamil, Plainsboro, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 167 days.

(21) Appl. No.: 14/575,495

(22) Filed: Dec. 18, 2014

(65) Prior Publication Data
US 2015/0269438 A1 Sep. 24, 2015

Related U.S. Application Data

(60) Provisional application No. 61/954,635, filed on Mar. 18, 2014, provisional application No. 62/074,674, filed on Nov. 4, 2014.

(51) Int. Cl.
| | |
|---|---|
| G06K 9/62 | (2006.01) |
| G01C 21/36 | (2006.01) |
| G06K 9/00 | (2006.01) |
| G06T 17/05 | (2011.01) |

(Continued)

(52) U.S. Cl.
CPC .......... *G01C 21/3673* (2013.01); *G01C 11/02* (2013.01); *G01C 21/32* (2013.01); *G06K 9/00637* (2013.01); *G06K 9/6267* (2013.01); *G06K 9/6293* (2013.01); *G06T 17/05* (2013.01); *G06T 2200/04* (2013.01); *G06T 2207/10012* (2013.01)

(58) Field of Classification Search
None
See application file for complete search history.

(56) References Cited

U.S. PATENT DOCUMENTS

| | | | |
|---|---|---|---|
| 7,313,252 | B2 | 12/2007 | Matei et al. |
| 8,224,097 | B2 | 7/2012 | Matei et al. |
| 8,345,988 | B2 | 1/2013 | Shan et al. |

(Continued)

OTHER PUBLICATIONS

Hadsell et al., "Complex Terrain Mapping with Multi-Camera Visual Odometry and Realtime Drift Correction", 2012 Second Joint 3DIM/3DPVT Conference: 3D Imaging, Modeling, Processing, Visualization & Transmission, IEEE publication, 2012, pp. 493-500.*

(Continued)

*Primary Examiner* — Brian P Werner
(74) *Attorney, Agent, or Firm* — Barnes & Thornburg LLP

(57) ABSTRACT

A multi-sensor, multi-modal data collection, analysis, recognition, and visualization platform can be embodied in a navigation capable vehicle. The platform provides an automated tool that can integrate multi-modal sensor data including two-dimensional image data, three-dimensional image data, and motion, location, or orientation data, and create a visual representation of the integrated sensor data, in a live operational environment. An illustrative platform architecture incorporates modular domain-specific business analytics "plug ins" to provide real-time annotation of the visual representation with domain-specific markups.

20 Claims, 14 Drawing Sheets

(51) Int. Cl.
   *G01C 11/02* (2006.01)
   *G01C 21/32* (2006.01)

(56) References Cited

U.S. PATENT DOCUMENTS

| | | |
|---|---|---|
| 8,861,842 B2 | 10/2014 | Jung et al. |
| 2003/0218674 A1 | 11/2003 | Zhao et al. |
| 2006/0013450 A1 | 1/2006 | Shan et al. |
| 2006/0256200 A1 | 11/2006 | Matei et al. |
| 2009/0310867 A1 | 12/2009 | Matei et al. |
| 2011/0255741 A1 | 10/2011 | Jung et al. |
| 2012/0093396 A1* | 4/2012 | Dai ................ G06K 9/6262 382/159 |
| 2012/0106800 A1 | 5/2012 | Khan et al. |
| 2012/0314935 A1 | 12/2012 | Cheng et al. |
| 2013/0004017 A1* | 1/2013 | Medasani ............ G01S 7/412 382/103 |
| 2014/0029145 A1 | 1/2014 | Mayerhofer et al. |
| 2014/0270494 A1 | 9/2014 | Sawhney et al. |

OTHER PUBLICATIONS

Kammerl, J., "Real-time Compression of Point Cloud Streams," IEEE International Conference on Robotics and Automation (ICRA), May 2012.
U.S. Appl. No. 61/954,635, filed Mar. 18, 2014.
U.S. Appl. No. 62/074,674, filed Nov. 4, 2014.

\* cited by examiner

US 9,476,730 B2

REAL-TIME SYSTEM FOR MULTI-MODAL 3D GEOSPATIAL MAPPING, OBJECT RECOGNITION, SCENE ANNOTATION AND ANALYTICS

CROSS-REFERENCE TO RELATED APPLICATIONS

This application claims the benefit of and priority to U.S. Provisional Application Ser. No. 61/954,635, filed Mar. 18, 2014, and U.S. Provisional Application Ser. No. 62/074,674, filed Nov. 4, 2014, each of which is incorporated herein by this reference in its entirety.

GOVERNMENT RIGHTS

This invention was made in part with government support under contract number N00014-12-C-0070 awarded by the Office of Naval Research-Arlington. The Government has certain rights in this invention.

BACKGROUND

This disclosure relates to the technical fields of computer vision, mobile robot navigation, and geospatial mapping and analysis. In computer vision, mathematical techniques are used to detect the presence of and recognize various elements of the visual scenes that are depicted in digital images. Localized portions of an image, on which specific types of computations are done to produce visual features, may be used to analyze and classify the image. Low-level and mid-level features, such as interest points and edges, edge distributions, color distributions, shapes and shape distributions, may be computed from an image and used to detect, for example, people, objects, and landmarks that are depicted in the image. Machine learning algorithms are often used for image recognition.

In robot navigation technology, cameras and other sensors are used to determine the robot's location and orientation with respect to its surrounding real world environment (i.e., the robot's frame of reference). Computer vision techniques and mathematical computations are performed to interpret digital images of the environment within the robot's frame of reference, generate a mathematical representation of the environment, and generate a mapping of objects in the real world to the mathematical representation of the environment (e.g., a "map"). The robot uses the map to navigate about its environment. In order to navigate, the robot performs mathematical computations to develop a navigational path to a goal location.

Geospatial technology relates to the acquisition, analysis, and presentation of geographical and/or geospatial data, such as Global Positioning System (GPS) data and geographic information system (GIS) data.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
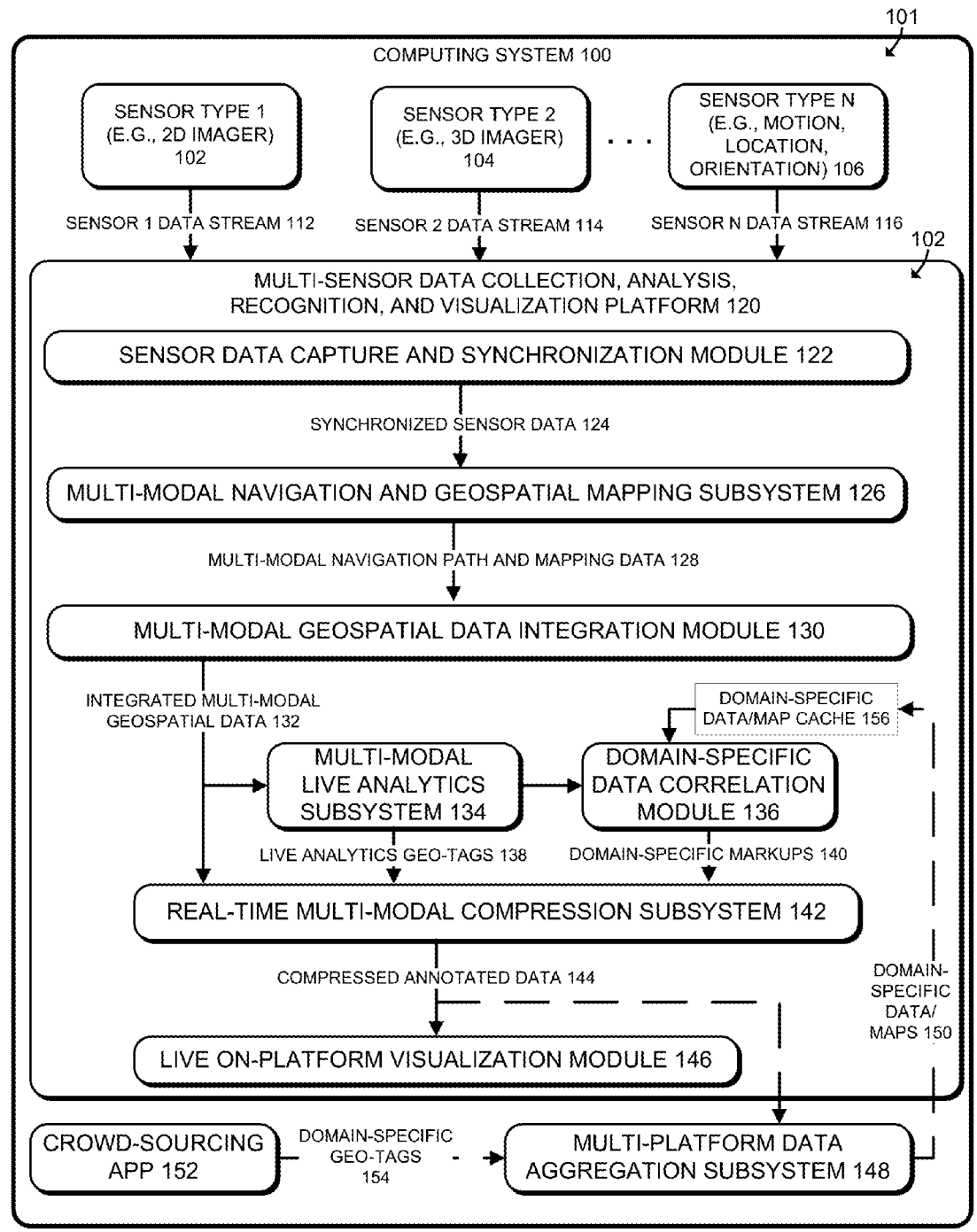
FIG. 1 is a simplified schematic diagram of an environment of at least one embodiment of a computing system including a multi-sensor data collection, analysis, recognition, and visualization platform as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Mobile robots, vehicles, and other mobile computing devices can be equipped with a number of different types of "live" sensors, such as cameras, LIDAR, and GPS, which can collect a range of different types of information about the real world physical environment surrounding the device, in real time. The technology disclosed herein can, in real time, integrate the diverse sensor data produced by these and/or other multiple different types of live sensors, including three-dimensional data, in order to provide real-time analysis and mapping of geospatial areas using an automated tool. The disclosed technology can analyze and annotate the integrated sensor data using domain-specific business logic and/or more 'generic' analytics, as needed. For example, the disclosed architecture enables the use of "plug in" data analytics modules designed for specific applications, such as surveillance, situation awareness, facility and equipment monitoring, asset monitoring, disaster relief, search-and-rescue, and/or other applications. Integrating live multi-sensor multi-modal data, including three-dimensional (3D) data, in a real-time system as disclosed herein can, among other things, enable low-latency map updates and analytics to be delivered to requesting users and/or services in real time or interactively. Additionally, the integration of data produced by multi-modal sensors, such as cameras, LIDAR, and GPS, can provide improved map accuracy and enable a broad range of analysis and information products.

Referring now to FIG. 1, an embodiment of a computing system 100 implementing an automated tool for the collection, analysis, recognition and visualization of multi-sensor multi-modal data, including 3D data, is shown. In FIG. 1, the computing system 100 is shown in the context of an environment 101 that may be created during the operation of the computing system 100 (e.g., a physical and/or virtual execution or "runtime" environment). The computing system 100, and each of the platforms, subsystems, modules, and other components of the computing system 100, is embodied as a number of machine-readable instructions, data structures and/or other components or devices, which may be implemented as computer hardware, firmware, software, or a combination thereof.

The illustrative computing system 100 includes a multi-sensor data collection, analysis, recognition, and visualization platform ("platform") 120. The illustrative platform 120 may be embodied as a mobile computing device, including a navigation-capable device such as a mobile robot, an unmanned or unpiloted ground and/or aerial vehicle (e.g., a drone, a "driverless" vehicle, etc.), a motorized vehicle, or even in some cases as a personal mobile electronic device (e.g., smart glasses, smart appliance, etc.). In other embodiments, the platform 120 is embodied as another type of computing device, such as a component of a security or surveillance system that is mounted to a wall or fixture, or as a combination of multiple devices.

In operation, the platform 120 receives sensor data streams 112, 114, 116 from a number of sensors 102, 104, 106. The sensors 102, 104, 106 are of "N" different sensor types (where "N" is a positive integer). For example, the sensor 102 may be embodied as a two-dimensional (2D) image sensor (e.g., a 2D still or video camera); the sensor 104 may be embodied as a 3D image sensor (e.g., LIDAR), and the sensor 106 may be embodied as an inertial sensor such as an inertial measurement unit (IMU) (including, e.g., an accelerometer and a gyroscope) or another type of sensor capable of producing motion, location, and/or orientation data. In the illustrative embodiments, the sensor 106 is a "low-end" IMU, such as a Micro-Electro-Mechanical Systems (MEMS) IMU that is readily commercially available and thus suitable for use in connection with a wide range of consumer-grade applications. In other embodiments, the sensors 102, 104, 106 may include a "higher-end" IMU and GPS-based integrated navigation system.

The illustrative platform 120 is embodied as a "software pipeline" including a set of interconnected modules including a sensor data capture and synchronization module 122, a multi-modal navigation and geo-spatial mapping subsystem 126, a multi-modal geo-spatial data integration module 130, a multi-modal live analytics subsystem 134, a domain-specific data correlation module 136, a real-time multi-modal compression subsystem 142, and a live on-platform visualization module 146. In other embodiments, any of the modules/subsystems 122, 126, 130, 134, 136, 142, 146 may be embodied as hardware, firmware, software, or a combination thereof.

The modules/subsystems 122, 126, 130, 134, 136, 142, 146 interface with the live sensors 102, 104, 106, align and analyze the sensor data 112, 114, 116, correlate the sensor data 112, 114, 116 with domain-specific business data (e.g., domain-specific data/maps 150 stored at least temporarily in a domain-specific data/map cache 156), compress and transmit the resulting information (e.g., compressed multi-modal data 144, which may include annotations such as geo-tags 138 and/or markups 140, as described below), and provide visualization and interactive user interfaces on the platform 120 and/or other computing devices, as described in more detail below. Unlike other approaches, embodiments of the platform 120 can operate in real-time, and can combine multi-sensor, multi-modal navigation, mapping, analytics, compression, and visualization functionality, all in a single architecture.

Platform Architecture

Referring further to FIG. 1, the illustrative sensor data capture and synchronization module 122 operates as front-end software that communicates with the sensors 102, 104, 106, synchronizes the sensor data streams 112, 114, 116, and timestamps the sensor data 112, 114, 116 such that the data 112, 114, 116 from all of the sensors 102, 104, 106 can be utilized concurrently (e.g., simultaneously). The sensor data capture and synchronization module 122 outputs synchronized sensor data 124 for use by the multi-modal navigation and geospatial mapping subsystem 126. The illustrative multi-modal navigation and geospatial mapping subsystem 126 uses the synchronized sensor data 124 to make temporal, spatial and geospatial associations across the multi-modal sensor data 112, 114, 116, in order to estimate both a navigation path of the platform 120 and also to build up map data (e.g., a platform-internal representation of the real world environment surrounding the platform 120, with respect to a frame of reference of the platform 120). The multi-modal navigation and geospatial mapping subsystem 126 outputs multi-modal navigation and mapping data 128 for use by the multi-modal geospatial data integration module 130. The multi-modal geospatial data integration module 130 executes data integration and data fusion algorithms on the multi-modal navigation path and mapping data 128 to produce integrated multi-modal geospatial data 132, e.g., geo-spatially organized 3D maps. The integrated data 132 is used by the multi-modal live analytics subsystem 134 and the real-time multi-modal compression subsystem 142. The multi-modal live analytics subsystem 134 applies different object and/or scene detection and recognition algorithms to the geo-spatially integrated data 132, and outputs annotations of the integrated data 132, e.g., live analytics geo-tags 138. Whereas the analytics performed by the multi-modal live analytics subsystem 134 may utilize "generic" algorithms in some embodiments (e.g., standard vehicle or face detection algorithms), the domain-specific data correlation module 136 applies domain-specific business logic for a selected (e.g., specialized) field-of-interest, and outputs domain-specific markups 140 for the integrated data 132, for use by the compression subsystem 142. The annotations produced by the live analytics subsystem 134 and/or the domain-specific data correlation module (e.g., the geo-tags 138 and the domain-specific markups 140) may take the form of, for example, graphical overlays, such as color-coded highlighting, graphical symbols, markings such as lines, circles and arrows, etc. In some embodiments, these annotations may be interactive such that if activated by a user (e.g., by a tap on a touchscreen display showing a visualization of the compressed multi-modal data 144), they may display additional information, provide an expanded user input area into which a user may input notes or other information, or user activation of the interactive annotation may launch or otherwise provide access to another application or service, such as a messaging service.

The architecture of the platform 120 allows for each or either of the multi-modal live analytics subsystem 134 and the domain-specific data correlation module 136 to be implemented as "plug in" modules, in that the live analytics subsystem 134 and/or the data correlation module 136 can be selected based on the needs or the design of a particular implementation of the platform 120. The real-time multi-modal compression subsystem 142 utilizes compression algorithms that develop a 3D representation of the integrated data 132 that is suitable for compression and live streaming, and outputs the compressed multi-modal data 144 (e.g., annotated 3D-2D data streams) for use by the live on-platform visualization module 146 and/or a multi-platform data aggregation subsystem 148, which is illustratively located off of the platform 120. The live on-platform visualization module 146 prepares a domain-specific visualization of the collected and integrated map data 132 and analytics results (e.g., geo-tags 138, markups 140), which can be accessed directly on the platform 120 in the field, or at another computing device (e.g., a computing device of the multi-platform data aggregation subsystem 148). The multi-platform data aggregation subsystem 148 receives the compressed multi-modal data 144 from the platform 120 and, in some embodiments, other platforms as well. The data aggregation subsystem 148 fuses the annotated multi-modal data 144 received from all platforms 120 into a centralized aggregated map database, which may be stored in a data storage device on the platform 120 or on one or more other devices (e.g., data storage device 1918 and/or 1978, shown in FIG. 19). The data aggregation subsystem 148 applies business logic to the aggregated multi-modal data 144 to interpret the aggregated data alone or in combination with other business-specific data that is accessible to the data aggregation subsystem 148. The crowd-sourcing app 152 may be embodied as, for example, a business-specific mobile application for modern smartphones or other personal electronic devices. Data made available by the crowd-sourcing app 152 can be used to augment the business analytics output and 3D map information (e.g., integrated map data 132, geo-tags 138, markups 140), in real-time. For instance, the crowd-sourcing app 152 may supply domain-specific geo-tags 154 that have been obtained or derived from the public crowd-sourcing of information over the Internet.

Figure 19:
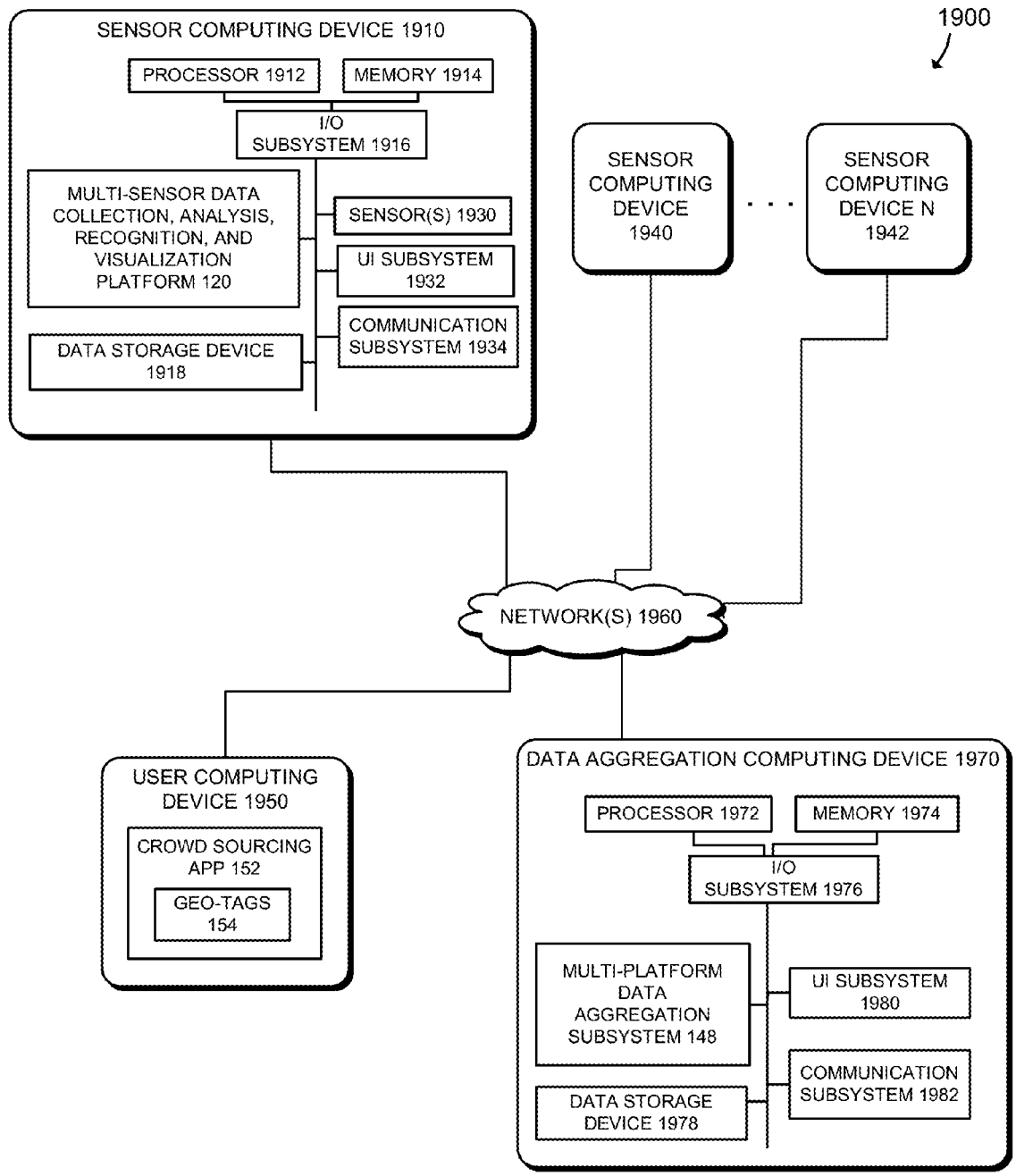
FIG. 19 is a simplified block diagram of an exemplary computing environment in connection with which at least one embodiment of the system of FIG. 1 may be implemented.

As shown in FIG. 19, described below, the platform 120 may communicate with one or more other computing devices, such as user computing devices (e.g., desktop, laptop, or tablet computers) and enterprise or "command center" computing devices (e.g., servers, networks of servers, etc.). For example, the platform 120 may transmit data collected from the sensors 102, 104, 106 and processed by the platform 120 to the multi-platform data aggregation subsystem 148, which may be embodied in a data aggregation computing device 1970, and the crowd-sourcing application 152 may be installed on a user computing device 1950.

Data Synchronization

Referring now in more detail to the sensor data capture and synchronization module 122 of FIG. 1, the illustrative sensor data capture and synchronization module 122 reads the data 112, 114, 116 output by the sensors 102, 104, 106 continuously while the platform 120 is in operation. The data capture and synchronization module 122 tightly integrates and synchronizes the data 112, 114, 116 before publishing the synchronized sensor data 124 for use by the navigation and mapping subsystem 126 and the data integration module 130. Illustratively, the data capture and synchronization module 122 represents each type of sensor 102, 104, 106 (e.g., LIDAR, inertial measurement unit (IMU), camera) in software by an abstract class that can be instantiated using different drivers and which can be configured differently for different types of sensor devices. The data capture and synchronization module 122 reads the data 112, 114, 116 asynchronously or synchronously from each sensor device 102, 104, 106, timestamps the data 112, 114, 116, and publishes the data 124 for use by the downstream modules (e.g., modules 126, 130, etc.). The processes performed by the data capture and synchronization module 122 helps ensure low-latency of the pipeline, such that the delivery of geospatial analytics and mapping data occurs in real time, or at least in interactive time.

Navigation and Mapping

Figure 2:
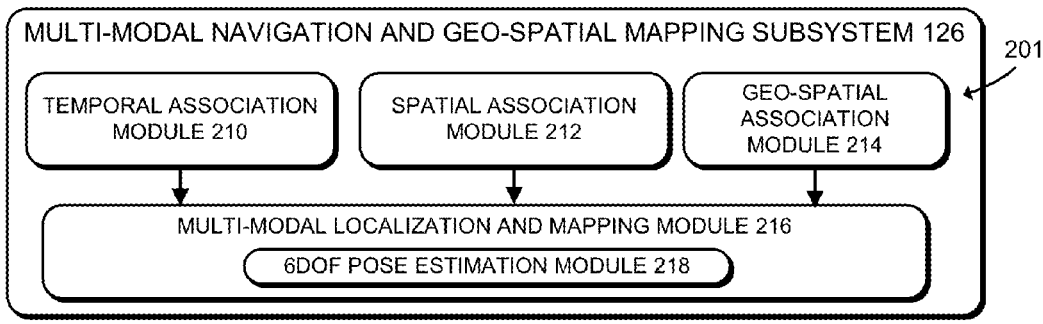
FIG. 2 is a simplified schematic diagram of an environment of at least one embodiment of the multi-modal navigation and geo-spatial mapping subsystem of FIG. 1, including a 6DOF pose estimation module as disclosed herein.

Referring now to FIG. 2, components of an embodiment of the multi-modal navigation and geospatial mapping subsystem 126 of FIG. 1 are shown in more detail. Each of the components shown in FIG. 2 may be embodied as software, hardware, firmware, or a combination thereof. In FIG. 2, the components of the navigation and geospatial mapping subsystem 126 are shown in the context of an environment 201 that may be created during the operation of the computing system 100 (e.g., a physical and/or virtual execution or "runtime" environment). The illustrative navigation and mapping subsystem 126 includes a temporal association module 210, a spatial association module 212, a geospatial association module 214, and a multi-modal localization and mapping module 216 (which includes a 6DOF pose estimation module 218, described in more detail below with reference to FIG. 6). The components of the navigation and mapping subsystem 126 operate to maintain accurate position and orientation information for each of the sensors 102, 104, 106, and make temporal, spatial and geospatial associations across the data 112, 114, 116 obtained from the various different sensors 102, 104, 106. The operations performed by the components of the navigation and mapping subsystem 126 allow the map representation 128 to be created over time. The navigation and mapping subsystem 126 is capable of exploiting various combinations of multi-modal observations derived from the data 124 to generate a navigation path and map 128 for the platform 120. For example, the navigation and mapping subsystem 126 can utilize a combination of data obtained from an IMU and video data to estimate an initial navigation path for the platform 120, and then use the relative 6 degrees of freedom (6DOF) poses that are estimated by the 6DOF pose estimation module 218 to generate a 3D map based on data obtained from, e.g., a scanning LIDAR sensor. The 3D LIDAR features can then be further exploited to improve the navigation path and the map previously generated based on, e.g., the IMU and video data.

Components of the navigation and mapping subsystem 126 compute navigation estimation for the platform 120. For reliable integration of LIDAR and other multi-modal sensor data, accurate geospatial position and orientation estimates of the sensor system (e.g., the combination of sensors 102, 104, 106) are needed. Whereas other approaches rely on expensive, high-end IMU and GPS-based integrated navigation systems to provide the requisite position and orientation estimates, the disclosed navigation and mapping subsystem 126 can operate equally as well using, e.g., a MEMs IMU-based system. As described below with reference to FIG. 6, the navigation and mapping subsystem 126 integrates other sensor measurements, such as visual features obtained from 2D and/or 3D imaging devices, with the position and orientation information, to enable robust 6DOF motion estimation.

Data Integration

Referring now in more detail to the multi-modal geo-spatial data integration module 130 of FIG. 1, components of the illustrative multi-modal geo-spatial data integration module 130 integrate and fuse the multi-modal navigation path and mapping data 128 in a 3D geospatial map. The accurate position estimation of the different sensors 102, 104, 106 with respect to real world coordinates and to the other sensors 102, 104, 106, performed by the navigation and mapping subsystem 126, combined with the accurate synchronization of the sensor data 112, 114, 116 provided by the data capture and synchronization module 122, allows the data integration module 130 to integrate and fuse the data 128 in a 3D geospatial map. For example, a 3D map generated from LIDAR can be used to identify hyperspectral or RGB video features associated with the 3D surface generated from the map. Illustratively, the data integration module 130 fuses the sensor data 112, 114, 116 by combining the output of the different data sources (e.g., sensors 102, 104, 106) into a single channel or layer of the integrated map. For example, the output of different cameras with overlapping fields of view may be combined into a single RGB overlay, or the LIDAR points may be given color attributes from the overlay of the RGB or Hyper-Spectral imagery. The output of the data integration module 130 is geospatially aligned and integrated multi-modal data 132, which can be accessed for immediate compression and visualization by the compression subsystem 142 and visualization module 146, and/or analyzed by the analytics subsystem 134 and data correlation module 136.

Live Analytics and Domain-Specific Data Correlation

Figure 3:
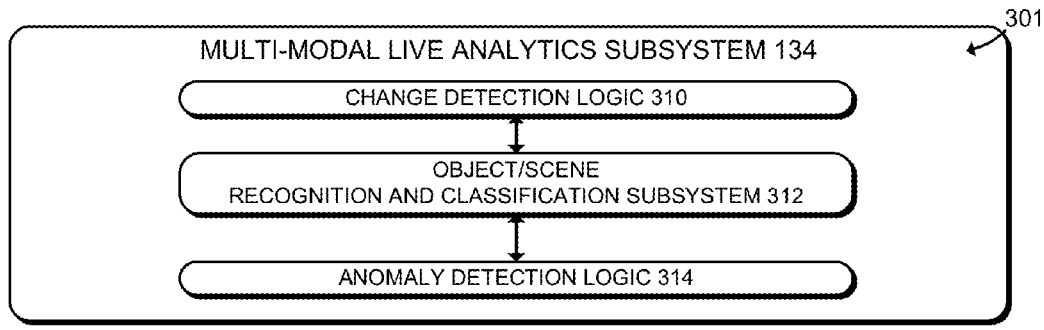
FIG. 3 is a simplified schematic diagram of an environment of at least one embodiment of the multi-modal live analytics subsystem of FIG. 1, including an object/scene recognition and classification subsystem as disclosed herein.

Referring now to FIG. 3, components of an embodiment of the multi-modal live analytics subsystem 134 of FIG. 1 are shown in more detail. Each of the components shown in FIG. 3 may be embodied as software, hardware, firmware, or a combination thereof. In FIG. 3, the components of the multi-modal live analytics subsystem 134 are shown in the context of an environment 301 that may be created during the operation of the computing system 100 (e.g., a physical and/or virtual execution or "runtime" environment).The illustrative multi-modal live analytics subsystem 134 includes a change detection module 310, an object/scene recognition and classification subsystem 312, and an anomaly detection module 314. The illustrative object/scene recognition and classification subsystem 312 is described in more detail below with reference to FIGS. 7A and 7B. The components of the live analytics subsystem 134 compute live analytics on the 3D multi-modal data 132 to extract higher-level information constructs that can be exploited by other modules and/or services. The platform 120 provides a plug-and-play framework to plug in analytics modules according to the needs of a particular application. The recognition and classification component 312 of the live analytics subsystem 134 applies feature and attribute extraction methods to 2D and/or 3D multi-modal data 132. Detection and classification tools of the recognition and classification component 312 allow for identifying different objects of interest (e.g. roads, buildings, poles, wires, trees, foliage, people, animals, fire hydrants, transformers, sign-posts, billboards, bridges, vehicles etc.).

A change detection module 310 can compare the current multi-modal map 132 to a reference map or a previously-generated map, in order to identify areas of the map that have changed since an earlier round of data collection. An anomaly detection module 314 can identify regions that do not fit the norm (e.g., obstructed roadways or damaged buildings or tree limbs hanging over wires or poles down). The change detection module 310 allows the platform 120 to identify "real" changes (e.g., changes that are not due to occlusion) while reducing false alarms. In the illustrative system 100, the change detection module 310 exploits both 3D and 2D (e.g., video/hyperspectral) information for identifying changes in the data over time. In performing 3D change detection, the change detection module 310 distinguishes differences in the data that are due to occlusions from differences in the data that are due to actual change. The system 100 can be configured to (actively or passively) ensure that sufficient looks are maintained to avoid occlusions. With the occlusions omitted or ignored, the basic 3D and image changes can then be fed into a higher-level change evaluation module. In some embodiments, multi-modal training data is used to learn features of robust change and for suppression of false alarms. Such training is performed through, e.g., supervised training based on ground truthing pre-collected data, or by online observation of user-in-the-loop nominations.

Figure 13A:
FIGS. 13A and 13B are simplified examples of output of an application of the change detection module of FIG. 3 using three-dimensional aerial LIDAR data, including an annotated digital image.
Figure 13B:
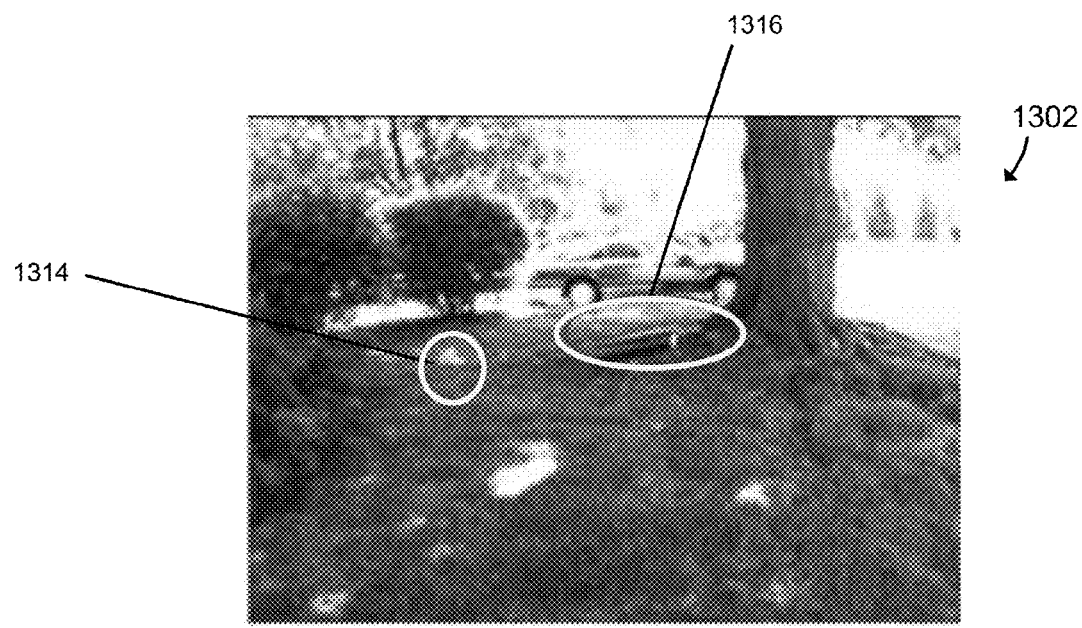

FIGS. 13A and 13B show examples of visualization output resulting from the operations of an embodiment of the live analytics subsystem 134, including operations of the change detection module 310. FIG. 13A illustrates a visualization 1301 of a map of 3D and image data of a particular geographic location, which is stored in a reference database. FIG. 13B illustrates a visualization 1302 of a map of 3D and image data of the same geographic location as in FIG. 13A, taken at a later point in time than the map of FIG. 13A. In the visualization of FIG. 13B, annotations 1314, 1316 indicate areas of the map that have changed in comparison to the prior map 1301. Notably, the changes detected by the live analytics subsystem 134 and highlighted on the visualization 1302 do not simply reflect changes due to occlusion or frame of reference. Rather, the annotations indicate actual changes in physical features of the real world environment depicted by the map 132.

In some embodiments, the general-purpose 3D analytics provided by the live analytics subsystem 134 are, by the domain-specific data correlation module 136, further expanded within the plug-and-play framework of the platform 120 to bring in specific business logic for one or more specialized fields-of-interest. The "plug-and play" aspect of the platform 120 provides a facility for accessing the business data and exploitation tools that is separate from and maintained outside the main sensor data streaming pipeline but which can utilize the sensor data. For example, a road-survey service can introduce specific logic about materials used in a road-construction process, in order to improve the detection of faults. Another example is a first responder team that might introduce a wide-area flood plain analysis module and building location and road-network map to determine real-time evacuation routes. A facility monitoring analysis module may detect fallen poles or foliage and tree branches touching wires, etc. A power company may use specific knowledge about the network of wire connections to determine the effect of a broken wire detected by the platform 120.

The system 100 provides a general-purpose geospatial caching framework to bring in the reference data 410 (e.g., prior data, business data) that includes information relevant to the current geospatial context. The reference data 410 is illustratively indexed spatially, using, e.g., an octree data structure, allowing for fast queries of data within a given area of interest. The data is automatically loaded from disk upon query if it is not in memory, and pushed to disk when no longer relevant. This type of general-purpose data caching framework allows large-scale storage and utilization of data and can accelerate the integration of new data types and new business logic.

Data Representation and Compression

Figure 4:
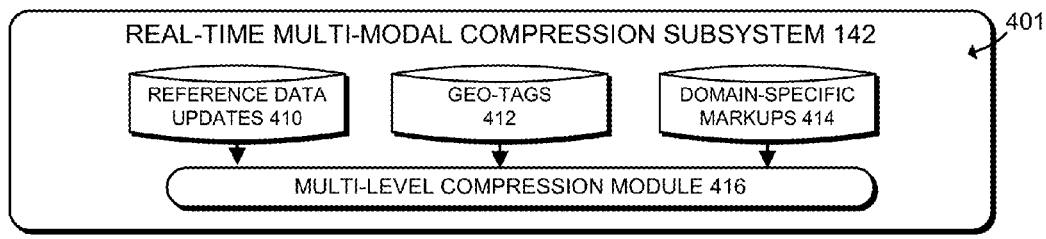
FIG. 4 is a simplified schematic diagram of an environment of at least one embodiment of the real-time multi-modal compression subsystem of FIG. 1, including a multi-level compression module as disclosed herein.
Figure 14:
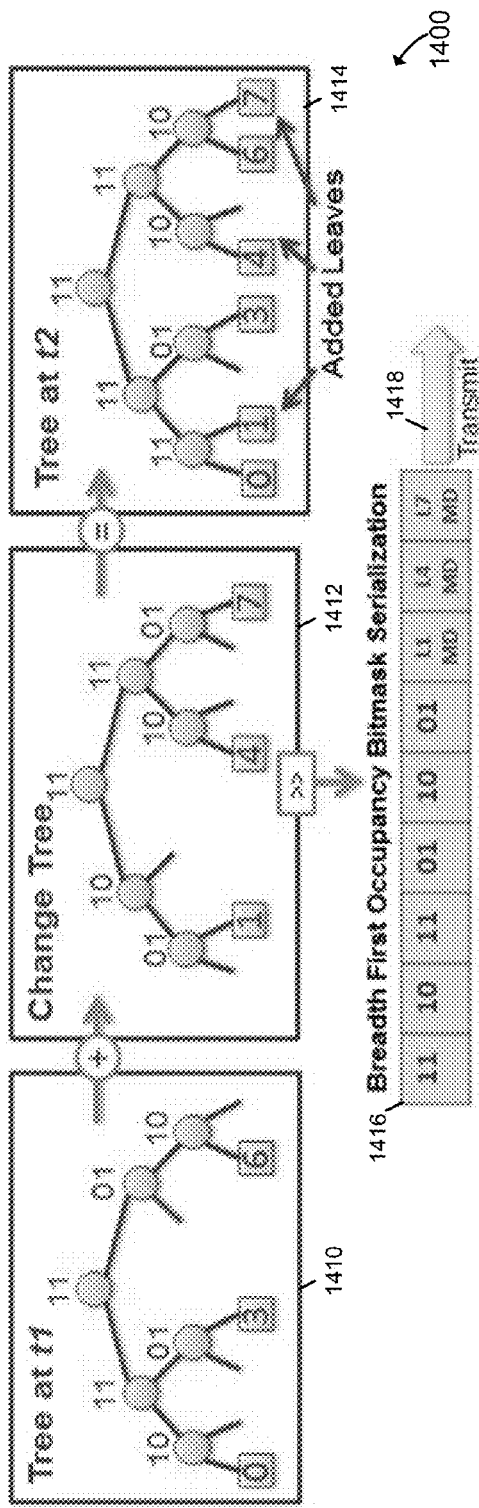
FIG. 14 is a simplified schematic diagram illustrating data representation and compression operations that may be performed by the multi-level compression module of FIG. 4.

Referring now to FIGS. 4 and 14, components of an embodiment of the real-time multi-modal compression subsystem 142 of FIG. 1 are shown in more detail. Each of the components shown in FIGS. 4 and 14 may be embodied as software, hardware, firmware, or a combination thereof. In FIG. 4, the components of the multi-modal compression subsystem 142 are shown in the context of an environment 401 that may be created during the operation of the computing system 100 (e.g., a physical and/or virtual execution or "runtime" environment). The illustrative real-time multi-modal compression subsystem 142 includes data stores for reference data updates 410, geo-tags 412, and domain-specific markups 414, as well as a multi-level compression module 416. The reference data 410 includes updated geospatial data 132 generated by the data integration module 130. The geo-tags 412 are obtained as a result of analytics performed by the live analytics subsystem 134. The domain-specific markups 414 are obtained as a result of the correlations performed by the domain-specific data correlation module 136. In other words, the illustrative data stores storing reference data 410, geo-tags 412, and markups 414 contain only the relevant data updates and annotations prepared based on the most recent set of sensor data 112, 114, 116, rather than the entire set of integrated multi-modal geospatial data 132. Thus, the multi-level compression module 416 operates using only the updated/changed set of reference data 410 and annotations (e.g., geo-tags 412, markups 414) as inputs to its compression algorithms.

The compression subsystem 142 enables efficient compression and robust transmission of the data between the air/ground mobile computing platform 120 and other devices, such as a "command center" computing system. The resulting data compression helps ensure real-time (or at least interactive time) delivery of data and analytics results to requesting users and/or services. As shown in FIG. 14, some embodiments of the compression subsystem 142 utilize an octree-forest based representation of map data, which can transmit the changes (e.g., additions) to the 3D collection of data 410, geo-tags 412, and markups 414 to a remote receiver (such as the data aggregation subsystem 148) as streaming elements. Other sources (such as video/HSI) can exploit the 2D data layers to improve compression. The illustrative compression subsystem 142 also provides for the handling of dropped data packets and corruption from faulty transmission in order to ensure resilient communication.

In some embodiments, the compression module 416 utilizes a sparsely occupied yet densely mapped 3D voxel grid, supported by an octree forest data structure. A summary of this technology is provided below. Further details are provided in the aforementioned U.S. Provisional Application Ser. No. 62/074,674, filed Nov. 4, 2014, which is entitled "Streaming Point Cloud Visualization." Voxel discretization size can be specified to be within the error threshold of the used depth sensing device (thus providing semi-lossless representation), or a preferred size. Points from the sensor are globally integrated into a world coordinate frame. Points then fall within the spatial region of prospective voxels, causing those voxels to become occupied. A mirrored voxel grid is maintained between the visualization "client" (e.g., a data aggregation platform) and the "server" (e.g., a robot), and differential changes to this grid are compressed and transmitted to the client, thus maintaining synchronized occupancy representations.

The world model can be understood as a collection of occupied cells within an infinitely extendable 3D regular grid of a specified resolution (voxel size), thus discretizing 3D space into a lattice of aligned addressable volumes. Grid cell occupancy is Boolean in nature, either being occupied or not. If at least one integrated point falls within a cell volume, that cell is considered occupied and any subsequent points falling within the same volume are considered redundant and ignored. An occupied cell is represented as a voxel and stored within the data representation. In computer-based modeling or graphic simulation, a "voxel" may refer to each element of an array of elements of volume that constitutes a notional three-dimensional space, e.g., each element of an array of discrete elements into which a representation of a three-dimensional object is divided.

In some embodiments, the data representation used to hold the world voxel occupancy information is an octree forest F that is defined to be a 3D array of forest cells C, each containing an octree O, arranged in a regular grid. In these embodiments, all octrees are of equal size and equal depth, where all leaves reside at the maximum depth of the tree. Existing octree leaves represent occupied voxels, thus the octree is used as memory efficient representation of a sparsely filled dense 3D grid.

Figure 15:
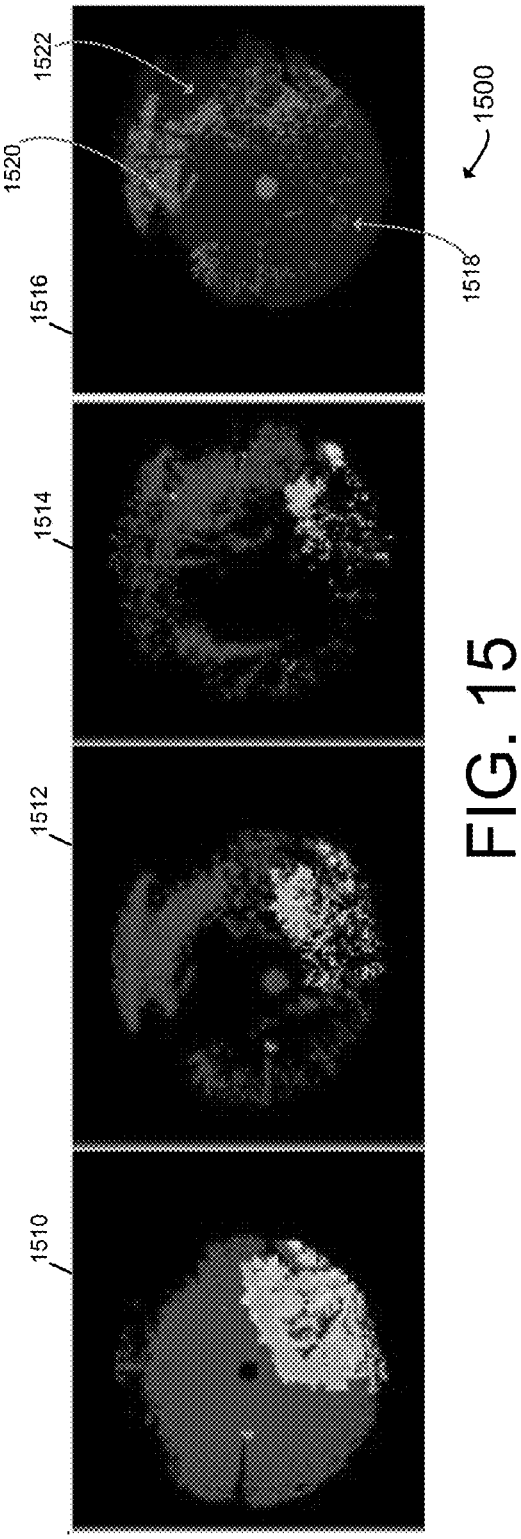
FIG. 15 is a simplified example of output of an application of the multi-level compression module of FIG. 4, including a set of digital images.

In the example of FIG. 14, compression of a data representation for efficient transmission is achieved by the multi-level compression module 416 through multiple levels, shown by the schematics 1410, 1412, 1414. The first level of compression (e.g., schematic 1410) is achieved by exploiting temporal and spatial redundancy within the accumulating integrated point cloud. Points are first quantized into configurably representative voxel occupancy; this has the effect of removing redundant points from consideration. The second level of compression (e.g., schematic 1412) is achieved during the encoding of the new voxels produced by change detection. The new voxels are added as leaves to a new octree (e.g., schematic 1414) whose spatial bounds match the forest octree they inhabit. The adding of leaves to a new octree is considered a change. Since the change tree bounds match the forest tree bounds, both of the trees will match structurally as the exact branch nodes that exist in the forest octree (e.g., 1414) to support the new leaves (voxels) will also exist in the change tree (e.g., 1412) to support those same leaves. Since the change is a true octree, it can be encoded into a byte stream (e.g., schematic 1416) by an octree structure serialization method. In this method, a breadth-first traversal of all branch nodes is performed and at each branch node visited, an 8-bit child occupancy mask is generated where each bit corresponds to the occupancy of the corresponding octant. The 8-bit child occupancy masks (bytes) are stored in order of generation, and the resulting byte array represents the complete structure of the octree. The disclosed 3D analysis can also allow for transmission of video or hyper-spectral data. For example, 3D classifications can help identify salient features in the data to allow more bits to be allocated to these regions during compression. FIG. 15 includes point cloud data representations 1510, 1512, 1514, 1516, which illustrate an occupancy-based pruning example. Image 1510 shows point cloud reference data with 1.89M (M=million) points with 8 cm (cm=centimeter) resolution sampling given 75 k (k=thousand) points. Image 1512 illustrates a swatch of 316 k point cloud that with temporal pruning has 12 k points. Image 1514 illustrates a swath of 309 k point cloud that with pruning has 9.5 k points. Image 1516 illustrates each swath, colored by red (1518), green (1520), and blue (1522), respectively, showing overlap and additions within the octree structure up to 8 cm. Another approach to data compression for streaming point cloud data for visualization, which utilizes an XOR representation to octree changes, is described in J. Kammerl, *Real-time Compression of Point Cloud Streams*, IEEE International Conference on Robotics and Automation (ICRA), 2012.

Visualization and Data Aggregation

Referring now in more detail to the live on-platform visualization module 146 of FIG. 1, the illustrative live on-platform visualization module 146 enables real-time visualization of the 3D map data, route and analytics directly on a display device on the platform 120. The real-time visualization of the data collection on the platform 120 allows a platform operator or other user to quickly verify the quality and coverage of the sensor data 112, 114, 116 and then re-collect data if necessary. The illustrative visualization module 146 thereby enables users to turn on and off layers of the real time data 112, 114, 116, and to manually annotate the map 132 with custom geo-tagged information if needed (in addition or as an alternative to the automated tagging provided by the analytics subsystem 134 and the correlation module 136). The visualization module 146 also allows a user to leave geo-tags in the form of messages to other users. For instance, rather than simply highlighting a portion of the visualization with a tag, a user can 'pin' a note to the area of interest on the visualization, alternatively or in addition to other forms of geo-tags.

Figure 5:
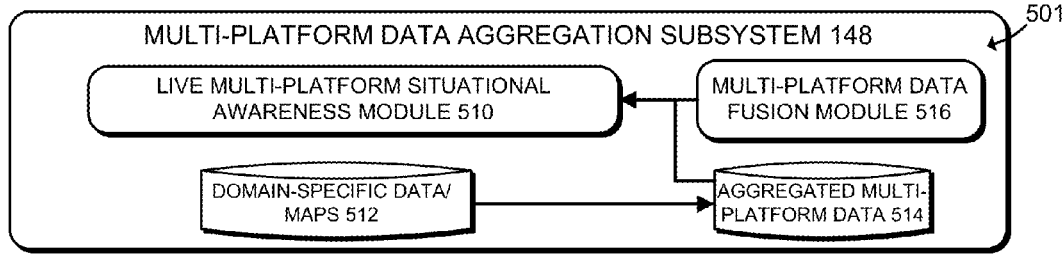
FIG. 5 is a simplified schematic diagram of an environment of at least one embodiment of the multi-platform data aggregation subsystem of FIG. 1.

Referring now to FIG. 5, components of an embodiment of the multi-platform data aggregation subsystem 148 of FIG. 1 are shown in more detail. Each of the components shown in FIG. 5 may be embodied as software, hardware, firmware, or a combination thereof. In FIG. 5, the components of the multi-platform data aggregation subsystem 148 are shown in the context of an environment 501 that may be created during the operation of the computing system 100 (e.g., a physical and/or virtual execution or "runtime" environment). The illustrative multi-platform data aggregation subsystem 148 includes a live multi-platform situational awareness module 510, a multi-platform data fusion module 516, a domain-specific data/maps data store 512, and an aggregated multi-platform data store 514. The live multi-platform situational awareness module 510 allows users of the data aggregation subsystem 148 to interact with the visualizations produced by the computing system 100 (in real time, in some embodiments). In some implementations, the data aggregation subsystem 148 is embodied as a central command center that can receive multimodal data streams from multiple platforms 120 and fuse the multi-platform multi-modal data streams into an aggregated map database 514 (e.g., by the multi-platform data fusion module 516). The aggregated data 514 can be shared across each of the platforms 120, e.g., as updates. Similarly, the aggregated data 514 can be fused with additional, business-specific data 512 and business logic can be applied to interpret and understand the integrated data (by, e.g., the domain-specific data correlation module 136). Examples of such business logic include the planning of domain-specific routing information or generating an appropriate response to a detected fault, where the real-time information helps modify subsequent business actions that are taken.

Increasingly, crowd-sourcing is being recognized as a valuable and powerful tool for gathering data. Crowd-sourcing is supported in the real-time system 100 through a mobile crowd-sourcing application 152 that can directly send data points to the aggregated map database 514 in the data aggregation subsystem 148. For example, a by a public network, a mobile user can mark a location on a map displayed on a display screen of his or her mobile device, and, with the crowd-sourcing app 152 select from a list in the mobile crowd-sourcing app 152 issues or observations that he or she has made while viewing the data. Such a list can be developed based on the business logic of information relevant to the specific business process, e.g., a user can mark a location with a pot-hole on a road utility app or take a picture of a damaged home after a tornado for a disaster response app. The user selections may include the GPS coordinates of the marked location and a picture of the observation or other supporting information, in some embodiments.

The computational resources of the illustrative data aggregation subsystem 148 enable large-scale 3D data visualization with layers of real-time data and higher-level metadata extracted either automatically or by a human user (e.g., a data analyst). The data aggregation subsystem 148 is configured with an application interface that permits extensive exploration of historical data, including change detection between different collections and long-duration temporal analysis.

The data aggregation subsystem 148 can provide visualization of the multi-modal data 144 (which may be annotated data with geo-tags 138 and/or markups 140) aggregated from multiple platforms 120, to users at locations that are remote from the platform 120 (e.g., at a ground facility or mobile device used to control the operation of the platform 120). Alternatively or in addition, aggregated multi-modal data 144 may be presented on the platform 120 via the live on-platform visualization module 146. In addition to the automated analytics provided by the live analytics subsystem 134 and the correlation module 136, users of the data aggregation subsystem 148 can manually nominate information/analytics to, for example, detect domain-specific anomalies or changes, or to detect specific objects of interest. The resulting information can in turn can be provided to the analytics modules (e.g., analytics subsystem 134, correlation module 136, used online or offline) for adapting algorithms for better performance. The user-specified nominations can also be used as exemplars for changing the visualization presentation to accommodate user-specific preferences.

Embodiments of the platform 120 provide a point cloud streaming pipeline that enables an interactive visualization system that is capable of providing a live and low-latency updated 3D representation of the immediate area surrounding the platform 120, as well as areas the platform 120 has already visited, in one geometrically consistent model/map. In some cases, the platform 120 provides remote platform operators with an improved ability to navigate and explore environments (including hostile environments), which is superior to that which can be achieved by the limited camera systems currently in use.

Some embodiments of the data aggregation subsystem 148 utilize, e.g., graphics processing unit (GPU) hardware-accelerated OpenGL for rendering the visualization. The medium of presentation for the environment-representative 3D model is a point cloud visualization, where each point is derived from the centroids of all voxels in the model (and possibly associated metadata). The specific technique for optimized OpenGL streaming buffer updates can be selected based on requirements of a particular implementation of the platform 120. In some implementations, it may be desirable to limit OpenGL central processing unit (CPU)-to-GPU implicit synchronizations for better performance.

In some embodiments, the visualization output includes a number of different colors, since drawing individual points as single white pixels would be ineffective for visually differentiating different environmental structures from one another. The visualization technology utilized by the visualization module 146 and/or the data aggregation subsystem 148 outputs data according to a color scheme and/or provides the user with a toolbox of point coloring schemes and interactively adjustable parameters (such as max colored range from virtual camera), which may be selected (e.g., toggled) as needed for various specific spatial awareness tasks. The different available color-coding modes include, for example: color gradient by height, color gradient by distance to selected point, color linear by distance to selected point, color by distance to virtual camera, color linear by distance to camera, color by normal orientation, color by detected planes, and color by projected camera imagery. Whereas changing the actual color properties of points by adjusting a GPU-resident vertex data would be very slow, the disclosed visualization technology utilizes vertex and fragment shaders (written in GLSL) to allow toggling between color modes on the fly, without ever touching the GPU-resident data. In some cases, all color generation is performed via a combination of vertex and shaders that run on the GPU. This method allows rapid toggling between colorization modes, by just switching the active shaders. This method is extremely fast, and is further optimized by utilizing the GLSL subroutine system.

Figure 17:
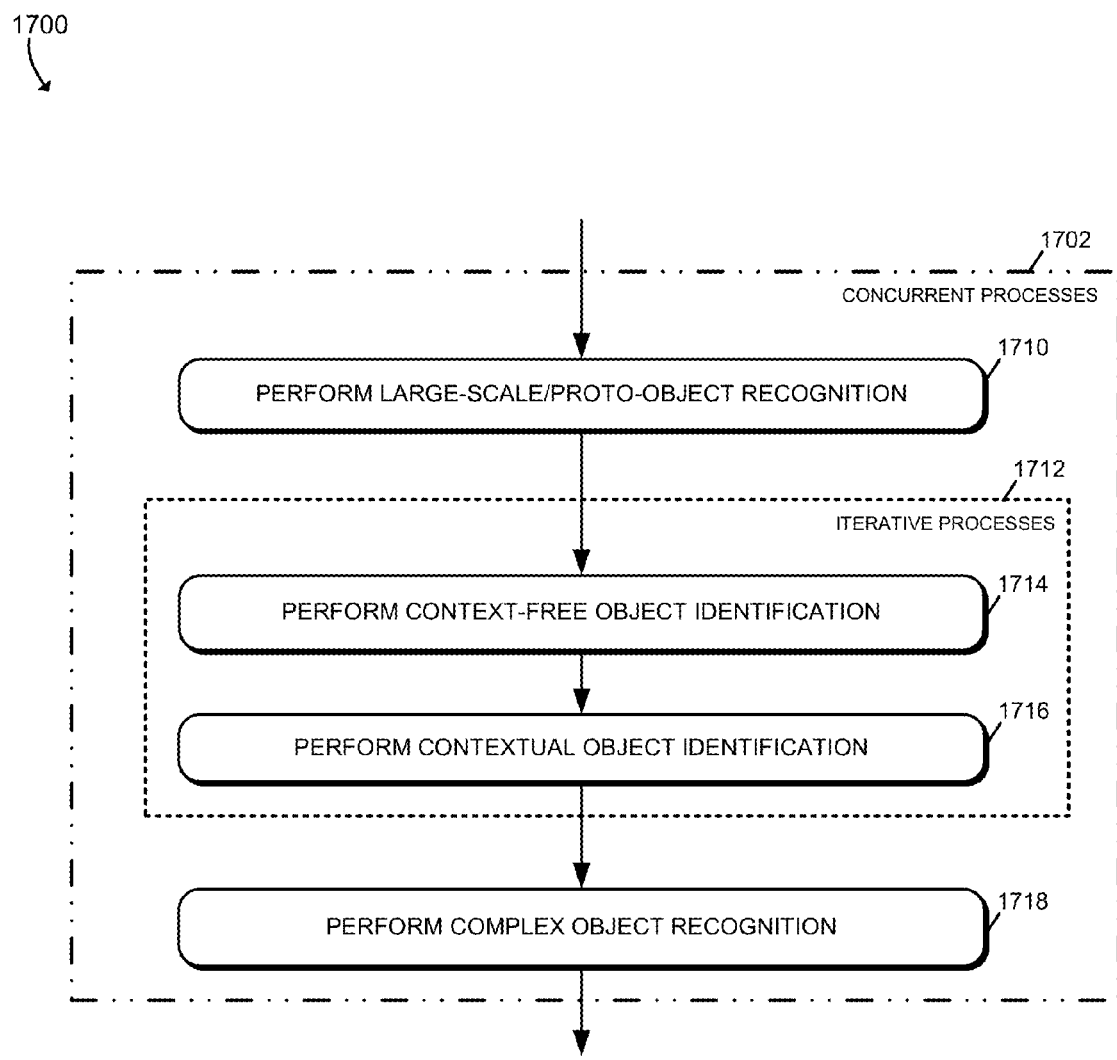
FIG. 17 is a simplified flow diagram of at least one embodiment of a process by which the computing system of FIG. 1 may perform object recognition and classification using multi-sensor, multi-modal data as disclosed herein.

Navigation within the point cloud is also provided by the disclosed visualization technology. In some embodiments, to facilitate relative sensor platform to point cloud spatial understanding, a virtual proxy model of the platform (such as a Talon robot) is rendered within the point cloud. The position and orientation of the virtual proxy model match those of a real world platform with respect to the point cloud. This method also allows the operator to switch between 3 base navigation modes: an orbit camera mode, which allows the operator to select any point within the entire point cloud and interactively yaw, pitch, and zoom the virtual camera about that point; an FPS flight mode, which allows the operator to fly the virtual camera as if it were an aircraft (that can hover), interactively adjusting speed; and a follow camera mode, which allows the operator to yaw, pitch, and zoom the virtual camera about the platform proxy, utilizing a simulated elastic tether (based on a critically damped spring model) between the platform proxy and the virtual camera, as the platform moves throughout the point cloud where the virtual camera is smoothly pulled along with it. The importance of point colorization and navigation is to aid the operator with comprehending the spatial distribution of the rendered points. Since the points are drawn on a 2D surface, depth cues are provided to aid in the operator's understanding of the points' relative placement within 3D space. This is accomplished through colorization by altering point color based on spatial parameters such as: distance from ground, distance from camera, distance from platform, planarity of a surface (via normal colorization), etc. This is also accomplished by parallax, via intuitive movement of the virtual camera in respect to the point cloud. Examples of colorization modes and visualization features are shown in FIG. 17 of the aforementioned U.S. Provisional Application Ser. No. 61/954,635, filed Mar. 18, 2014, entitled "Real-Time System for Multi-Modal 3D Geo-Spatial Mapping, Object Recognition, Scene Annotation And Analytics."

6DOF Pose Estimation

Figure 6:
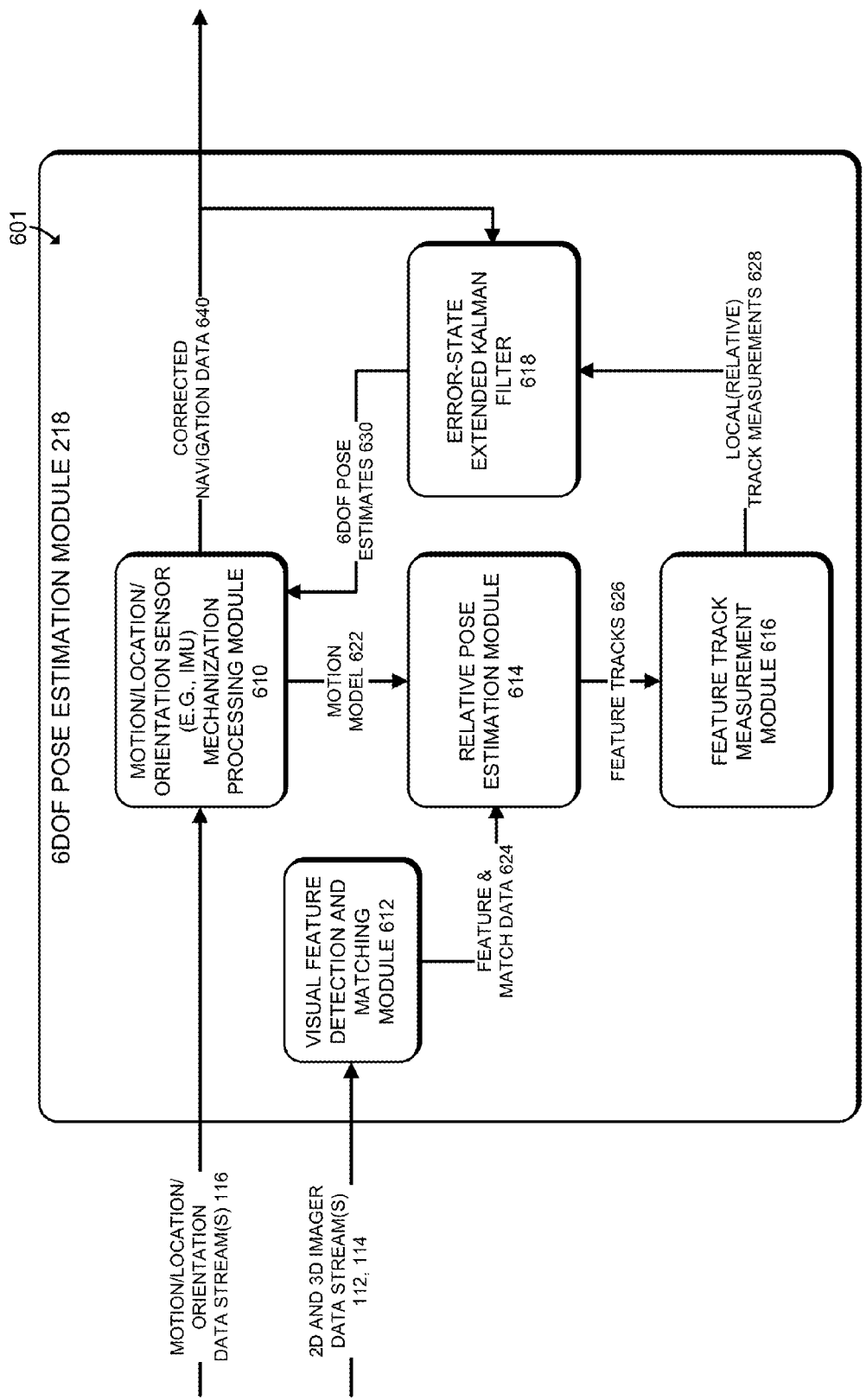
FIG. 6 is a simplified schematic diagram of an environment of at least one embodiment of the 6DOF pose estimation module of FIG. 2.

Referring now to FIG. 6, components of an embodiment of the 6DOF pose estimation module 218 of FIG. 2 are shown in more detail. Each of the components shown in FIG. 6 may be embodied as software, hardware, firmware, or a combination thereof. In FIG. 6, the components of the 6DOF pose estimation module 218 are shown in the context of an environment 601 that may be created during the operation of the computing system 100 (e.g., a physical and/or virtual execution or "runtime" environment). In the illustrative 6DOF pose estimation module 218, an "IMU-centric" framework for doing accurate 6DOF pose estimation even with lower-grade IMUs (such as MEMS IMUs) includes a motion/location/orientation sensor (e.g., "IMU") mechanization processing module 610, a visual feature detection and matching module 612, a relative pose estimation module 614, a feature track measurement module 616, and an error-state extended Kalman filter 618. The components of the 6DOF pose estimation module 218 utilize both motion/orientation/location data and visual features extracted from 2D and/or 3D imagery to generate 6DOF pose estimates. Motion/location/orientation data stream(s) 116 are input to the IMU mechanization processing module 610. The IMU mechanization processing module 610 generates a motion model 622. The visual features detection and matching module 612 receives 2D and/or 3D image sensor data streams 112, 114 and generates feature and match data 624. The relative pose estimation module 614 utilizes the motion model 622 and the feature and match data 624 to generate feature tracks 626. The feature tracks 626 are used by the feature track measurement module 616 to generate local (relative) track measurements 628, which are used by the error-state extended Kalman filter 618 to generate 6DOF pose estimates 630. The IMU mechanization processing module 610 utilizes the 6DOF pose estimates 630 to generate corrected navigation data 640 (e.g., an estimated navigation path for the platform 120), which can be used by other modules of the platform 120 as described herein.

In more detail, the illustrative Kalman filter module 618 utilizes an error-state (e.g., indirect) form of the Kalman filter in order to avoid the need for dynamic modeling of the complex kinematics associated with each specific sensor 102, 104, 106. In the pose estimation module 218, the motion model 622 is derived from integrating the gyroscope and accelerometer data from the IMU (as performed in the IMU mechanization processing module 610) to form the building block for state prediction, rather than explicitly modeling the platform dynamics and using the IMU on the measurement side. Since the IMU is able to follow very accurately the high frequency motion of the platform, the indirect Kalman filter operates on the inertial system error propagation equations, which evolve smoothly and are much more adequately represented as linear. An advantage of this approach is that the navigation solution can be transferred to another mobile platform (carrying equivalent sensors) without any changes to the sensor fusion algorithms.

As each new frame is received from data stream(s) 112, 114, visual features are extracted by the feature detection and matching module 612 by use of, e.g., a Harris corner feature detector. These features are matched by the feature detection and matching module 612 to the previously-received frame using, e.g., normalized correlation of image patches around each such feature. Match success or failure is determined based on, e.g., mutual agreement criterion. In some embodiments, the 6DOF pose estimation module 218 does not use any thresholding of correlation scores, rather it decides that a match is successful if both features in the current and previous frame pick each other as their best (highest scoring) matches. A feature track table that accommodates several hundred frames is used to record the feature locations and maintain the track information and track lengths. After the initial matching step, there are usually a great number of outliers due to false matches. In the pose estimation module 614, all features that are tracked for at least three frames (e.g., feature and match data 624) are input to a robust two-point relative pose estimation algorithm that enforces geometric constraints across three frames. Following this process, inlier feature tracks (e.g., feature tracks 626) are determined based on, e.g., the comparison of trifocal Sampson error for each feature against a predetermined threshold. Those tracks that fail this test are terminated and reset as fresh features that were newly detected at the current frame, as these features may become inliers in the future.

At every video frame of the data stream(s) 112, 114, the entire feature track history with inlier tracks from the current frame extending to the past frames in the sequence is made available to the Kalman filter in the error-state extended Kalman filter module 618. A separate measurement equation is created for each feature that is tracked for more than three frames. After this step, the measurement equations for all the tracks are stacked to form the final set of measurement model equations which are a function of both the previous state and the current predicted state, so they are relative (local) in nature as opposed to more typical global measurements which are a lot more straightforward to treat. In order to properly handle such relative measurements in the extended Kalman filter, in some embodiments, a stochastic cloning framework is employed. One approach to handling relative measurements between the previous and current time instants is to express them in terms of motion estimates between the two states and take into account the cross correlation arising from such a formulation. Stochastic cloning provides the framework to process such relative measurements by augmenting the state vector with two copies of the state estimate, one evolving and one stationary clone. The evolving clone is propagated by the process model (similar to a conventional Kalman filter framework), whereas the stationary clone is kept static and does not evolve. The relative measurement between the previous and current time instant is then expressed as a function of these two states, and a Kalman filter update, modified to incorporate the joint covariance of the two clone states, is performed.

Similar to the video based features, LIDAR based features can be integrated and tracked to provide measurements to the Kalman filter in the error-state extended Kalman filter module 618. However, in the case of scanning LIDAR systems, the initial Kalman pose estimates (e.g., 6DOF pose estimates 630) are used to locally integrate the LIDAR data based point to enable feature extractions. Salient features such a 3D spin-images can be utilized for tracking these features.

In some embodiments, an addition to the local Kalman filtering process, simultaneous localization and mapping (SLAM methods) can be used to improve precision while developing a navigation map. Embodiments of the disclosed system 100 utilize visual features such as HOG and SIFT descriptors for establishing longer range correspondences. Similarly, with LIDAR data, ICP (iterative closest point) methods can be used to establish longer range matches across swaths of locally integrated data. The longer range methods can also exploit the GPS data, DEM (digital elevation model) data and other sensor sources in the joint inference process.

Object Recognition and Classification

Figure 7A:
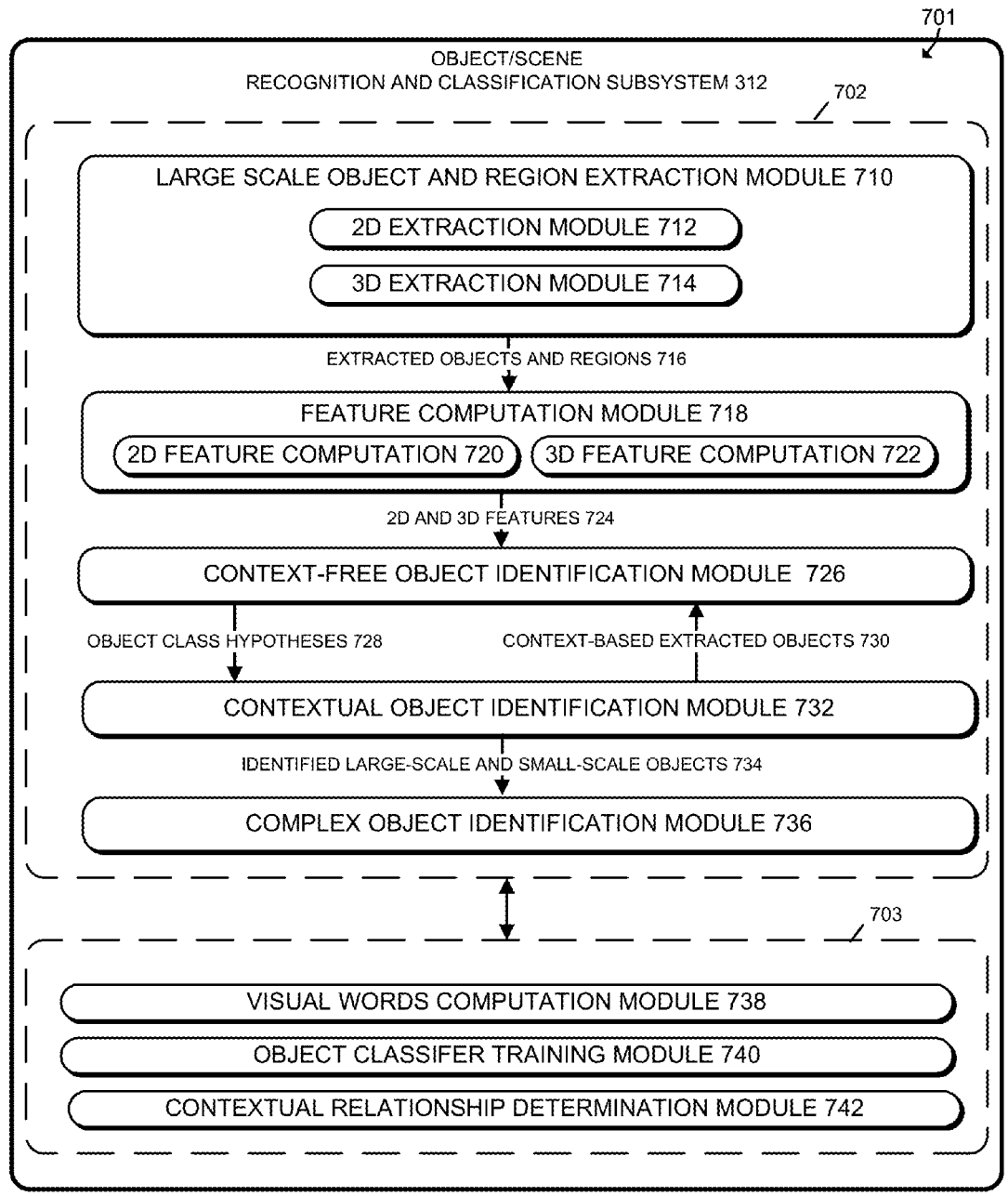
FIG. 7A is a simplified schematic diagram of an environment of at least one embodiment of the object/scene recognition and classification subsystem of FIG. 3.

Referring now to FIGS. 7A, 7B, and 8-12, components of an embodiment of the object/scene recognition and classification subsystem 312 of FIG. 3 are shown in more detail. FIG. 7A shows a functional architecture of a scalable object recognition system for detecting and identifying a large class of objects, even in cases where some objects can only be identified using the context of the full scene. Each of the components shown in FIG. 7A may be embodied as software, hardware, firmware, or a combination thereof. In FIG. 7A, the components of the object/scene recognition and classification subsystem 312 are shown in the context of an environment 701 that may be created during the operation of the computing system 100 (e.g., a physical and/or virtual execution or "runtime" environment). As described below, the illustrative object/scene recognition and classification subsystem 312 includes automated tools for feature and attribute extraction, object detection and scene classification. The recognition and classification subsystem 312 includes both "online" and "offline" functionality. Those modules that are typically implemented for online operational use (e.g., in an interactive, real-time operational environment of the platform 120) are denoted by the dashed box 702. The modules that are typically implemented for offline use (e.g., in the background or as part of the process of developing/maintaining the functionality of the online system 702) are denoted by the dashed box 703.

The illustrative online functionality 702 includes a large scale object and region extraction module 710, a feature computation module 718, a context-free object identification module 726, and a contextual object identification module 732. The illustrative offline functionality 703 includes a visual words computation module 738, an object classifier training module 740, and a contextual relationship determination module 742. One or more of the components of the offline functionality 703 may communicate with one or more of the components of the online functionality 702 from time to time, e.g., to provide model updates to the components of the online functionality 702.

The illustrated architecture provides a layered object recognition framework for the recognition of a set of object and scene classes (where a "class" may refer to a descriptive label, such as a type or category of objects). The layered framework progresses from recognition of simple to complex classes, from large scale structure recognition to finer scale recognition, and from independent object level recognition to recognition with contextual inferencing. Object extraction and identification are intertwined in an iterative computation in which progressive disambiguation of class labels is used to refine extraction, which in turn improves the accuracy of the object identification.

The illustrative architecture of the recognition and classification subsystem 312 realizes the object recognition algorithms as a scaleable system for large area classification with an extensible set of classes. In some embodiments, efficient data structures and algorithms for large scale handling of spatial data, image data, multi-dimensional features and learning classifiers are implemented using off-the-shelf systems. As a result, the disclosed architecture supports easy interfacing with users of the technology, and enables the recognition and classification subsystem 312 to transition to a real-time 3D reasoning system if desired.

In some applications, urban infra-structural objects, from dumpsters to alleys, are important for tactical operational planning. The disclosed technology (e.g., offline technology 703) can be configured to identify a comprehensive collection of urban objects. In some embodiments, object recognition technology is used to automatically extract and identify numerous urban and semi-urban classes of tactical relevance with 3D LIDAR and 2D EO (electro-optical) sensor data of city scale environments. This 3D urban object recognition technology can be deployed in, among other applications, real-time 3D query and reasoning systems.

The illustrative recognition and classification subsystem 312 is embodied as a layered end-to-end recognition system that understands a scene by extracting and identifying progressively complex object classes. Easy-to-detect, distinctive large-scale objects (e.g., ground, foliage, roofs, walls, and buildings) are recognized first as a coarse layer. Recognition of these large-scale objects exposes compact regions of space that are supported by the recognized objects, which are, e.g., the ground, a roof or a wall. The regions of space defined by the recognized larger-scale objects are extracted as "proto-objects" and may typically contain one or more as-yet unidentified classes of objects. Proto-object extraction provides a focus-of-attention mechanism for efficiently handling complexity in a large cluttered scene. Objects in these proto-object regions are progressively identified, applying multiple hypotheses to ambiguous objects. Some context-free objects (e.g., a crane, or a satellite dish) with discriminative, invariant features are identified first without contextual reasoning (where "context-free" may indicate that the object can be identified accurately without reference to the particular context in which it occurs). Context-sensitive objects (e.g., doors, parking area) are identified next utilizing 3D spatial relationships (where "context-sensitive" may indicate that an object's identification accuracy can be improved by the use of context information, such as surrounding or neighboring objects or landscape). Finally, compound objects (e.g., gas stations, which include buildings, gas pumps, parking areas, etc.) are identified through, e.g., bag-of-object characteristics (loose configuration of simpler objects co-located).

Using the layered architecture of the recognition and classification subsystem 312, early recognition of large scale and easily recognizable objects occurs pre-attentively and quickly, and sets the stage for recognizing more complex objects within a context. Using 3D and 2D data in a combined unary and contextual recognition approach avoids "inattentive blindness," where human visual systems miss conspicuous events. In contrast with one-filter-per-class and one-shot classification approaches, some embodiments of the disclosed approach can avoid errors by entertaining unique or multiple hypotheses as the data may suggest.

In the illustrative architecture, object recognition progresses in a continuous manner from large-scale structures to fine scale recognition and from independent context-free recognition to recognition with contextual inferencing. This architecture utilizes a multi-hypotheses, non-committal strategy in which early, coarse scale ambiguous recognition is successively refined with finer scale data and context that leads to progressively more unambiguous object recognition.

The illustrative large scale object and region extraction module 710 utilizes a 2D extraction module 712 and a 3D extraction module 714 to perform large-scale object extraction and initial proto-object extraction. In some embodiments, the large scale object and region extraction module 710 handles LIDAR scans by sub-dividing the scans to cover in the range of about 1-5 square kilometers of urban locales. The extraction module 710 handles the challenge of rapid area delimitation by first extracting and identifying "easy" objects recognizable as large-scale coarse entities, such as ground, foliage, roofs, walls, and buildings. This is accomplished through use of low-level 3D features: local planes, 3D scatter matrices, and tensor voting, and efficient data structures for the representation of occupied and free 3D space. Extraction and identification of the ground plane, buildings and similar large-scale structures achieves at least two goals. First, it provides context for finer scale object recognition, and second, it enables intelligent search to efficiently handle non-uniform space occupancy.

The extraction module 710 uses contextual frames of reference, such as ground and buildings, to extract isolated regions of space, referred to herein as proto-objects, which may contain multiple objects that are as yet unidentified. Finer scale objects within the proto-object regions are extracted and identified in subsequent modules of the object recognition and classification subsystem 312. The extracted proto-objects provide focus-of-attention for efficiently handling the complexity of a large-scale 3D scene.

The goal of the large-scale and initial proto-object extraction performed by the extraction module 710 is to rapidly analyze large areas of the scene using low-level cues such as planarity and perceptual grouping to generate 3D regions that contain objects of interest with high probability. To do this, the components of the extraction module 710 execute a series of algorithms, such as those described below.

1. Ground Extraction. The ground (e.g., earth, floor, roadway, etc.) is extracted using local vertical and planarity constraints with 3D data sampled at a coarse resolution. 3D points with z-component (local up direction) close to the local minimum ground height are retained as putative ground points. Local surface normals are computed at voxels with these ground points. Ground regions are grown from these voxels by recursively connecting neighboring voxels with consistent local plane estimates. This ensures a sharp delineation of the 3D objects that do not belong to the ground. A parametric model is finally fit to obtain a terrain model. Ground points are removed for the subsequent steps.

2. Off-Ground Local Surface Classification. At each voxel, the illustrative extraction module 710 adaptively performs an eigenvalue decomposition of the local 3D scatter matrix at multiple scales, thus ensuring a stable fit, while preserving local 3D discontinuities. Larger voxels are used to extract big structures such as buildings, while smaller voxels are used for other objects. Voxels are labeled with the rank of the scatter matrix as: locally planar (rank 1), curvilinear (rank 2), or 3D texture (rank 3).

3. Proto-Object Extraction. Rank 1 and rank 2 tensors are grouped over larger 3D regions using perceptual organization. Coherent 3D surface (rank 2), or wire-like regions (rank 1) are grouped into larger regions based on proximity and consistent surface normals or tangent directions, respectively. In some implementations, proto-objects are 3D regions that have a high likelihood of belonging to a part, or a whole object, that is to be identified in subsequent layers. The relationship between these regions is encapsulated in an adjacency graph, which will be used during contextual object identification performed by the contextual object identification module 732, described below. The Off-Ground Local Surface Classification and the Proto-Object Extraction are repeated at progressively finer resolutions as needed to extract smaller proto-objects.

4. Building Extraction and Vegetation Clutter Removal. Buildings are extracted within 3D regions using region descriptors such as: (i) histogram of angles between the normals of a region and the local ground normal; (ii) histogram of angles between normals of the region and the easting direction; (iii) histogram of projections of 3D points in a region along the ground direction; (iv) first and second order moments of 3D points within a region; (v) area of the region. These descriptors are used to train a classifier to label regions as: "clutter," "wall" (large, vertical surface), "roof" (large, horizontal or tilted surface), and "proto-object." Priors, such as heights of roofs, size of building walls are also incorporated into the classifier. Neighboring regions containing a roof and walls are further labeled as building candidates. The 3D orientation of each building and extracted proto-object are estimated from the region descriptors and projected into the corresponding 2D images to extract 2D object regions.

Figure 12:
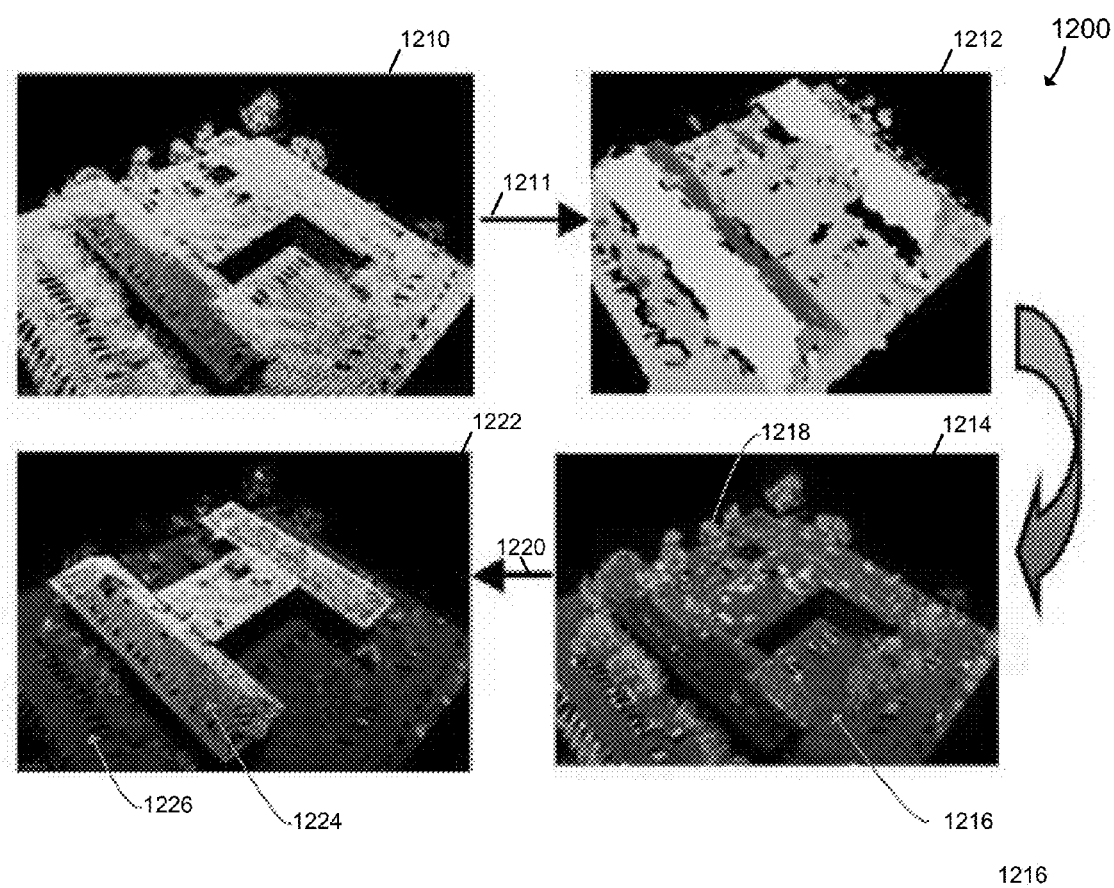
FIG. 12 is a simplified example of output of an application of the object/scene recognition and classification subsystem of FIG. 3 using three-dimensional aerial LIDAR data, including a set of annotated digital images.

The coarse-to-fine processing described above enables an efficient computation of distinctive coherent surfaces and rapid rejection of vegetation clutter, which lacks the smoothness of artificial objects. It also enables the inference of relationships between the proto-objects. In FIG. 12, an example 1200 shows results of building and ground extraction and foliage removal that have been achieved with 50 aerial data. In the example 1200, the image 1210 depicts the original point cloud; the image 1212 depicts a 2D planar surface grouping; the image 1214 depicts identification of planar structures (1216) vs. foliage (1218); and the image 1222 depicts identification of buildings (1224) vs. ground (1226). Other examples of large-scale and proto-object identification are provided in FIGS. 7 and 9 of the aforementioned U.S. Provisional Application Ser. No. 61/954,635.

Referring again to FIG. 7A, the feature computation module 718 performs feature computation for object recognition using the extracted objects and regions 716 output by the extraction module 710. Proto-objects extracted by the extraction module 710, the first layer, are recognized using modules the feature computation module 718, the context-free object identification module 726, the contextual object identification module 732, and the complex object identification module 736 in subsequent layers. The feature computation module 718 utilizes extracted objects and regions 716 produced by the extraction module 710 to generate a representation of objects in terms of data-driven parts. To do this, the feature computation module 718 uses invariant semi-local 3D and 2D features produced by, e.g., 3D feature computation module 722 and 2D feature computation module 720. The invariant 2D and 3D features enable the following: (1) objects can be recognized under occlusions and missing data, without the need for full geometric relationships between parts; (2) invariant features handle pose variations and viewing distances; (3) multi-scale features work with a wide range of resolutions present in aerial and ground collections; (4) clustered feature prototypes, called 3D shapemes, 2D visemes and 3D/2D textons, succinctly capture intra-class and inter-class variations for efficient object recognition.

Some examples of features for object recognition include invariant 3D shape histograms, such as spin images and shape contexts, 2D shape and appearance features such as histograms-of-gradients, steerable pyramids and Gabors, and texture features such as textons. In some cases, joint exploitation of 3D and 2D data is performed to fix the scale and perspective of 2D images for view invariant 2D feature computation. Occlusion reasoning in 3D can be used to infer missing object parts.

The feature computation module 718 utilizes semi-local, scale and pose invariant 3D and 2D features for object recognition. The 3D/2D shape and appearance (shapemes, visemes) and 3D/2D texture (textons) features provide robustness of recognition as well as efficiency of computation. These features are resilient to missing data, pose and view variations, partial occlusions and the presence of unknown classes as clutter and can handle intra- and inter-class appearance and shape variability. Generalizability with features enables recognition so that precise models for each class are not required. The semi-local discriminative features used by the feature computation module 718 for data-driven part- and sub-part based description of objects are designed to capture 3D and 2D shape, appearance and texture properties of a wide range of object classes.

Embodiments of the feature computation module 718 can: (1) work directly with point cloud data without the need for polygonal models of objects of interest, thereby enabling easy extension of the set of targeted features without expensive modeling and learning; (2) apply invariant surface and feature representations such as spin images, or the vertical support histogram, which are resilient to surrounding clutter, missing and incomplete data due to occlusions, and non-uniform densities in point cloud capture; (3) achieve precision alignment of 2D and 3D shapes for verification of features for ensuring high accuracy and low false alarms. Semi-local, multi-scale, invariant 3D and 2D features help address data and model issues, such as: robustness to partial occlusions, pose invariance, handling variable resolution and precision, resilience to clutter, part-based recognition, and intra- and inter-class variability. Additionally, the invariant 3D and 2D features can represent significant and salient components of an object without the need for precise segmentation into semantic parts. Instead, the presence of features in flexible geometric configurations is sufficient for robust recognition.

Figure 8:
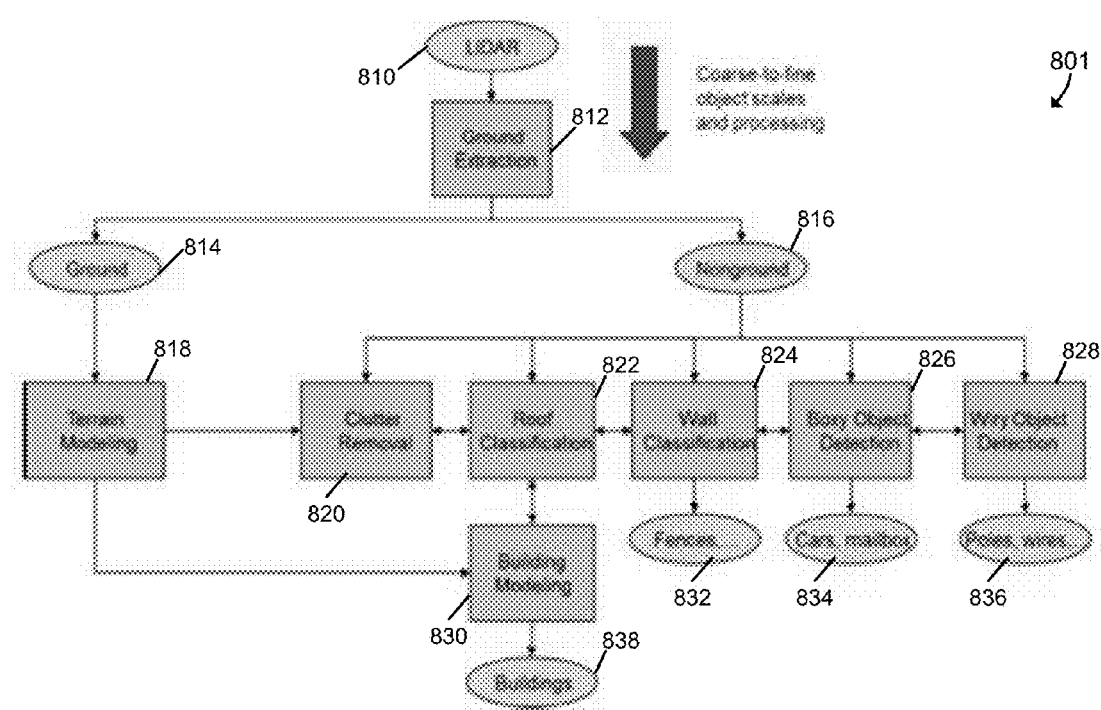
FIG. 8 is a simplified schematic diagram illustrating an example of large scale object recognition and scene classification of at least one embodiment of the object/scene recognition and classification subsystem of FIG. 3.

FIG. 8 depicts an example of a coarse-to-fine scene processing and classification system 801, which can be used for large scale object recognition by the extraction module 710. At 812, ground extraction algorithms are performed on LIDAR data 810 to classify the LIDAR data 810 as either ground 814 or non-ground 816. Terrain modeling 818 is performed on the ground data 814, and the output of terrain modeling 818 is processed by clutter removal algorithms 820 and/or building modeling algorithms 830. The non-ground data 816 is processed by one or more of: the clutter removal algorithms 820, roof classification algorithms 822, wall classification algorithms 824, boxy object detection algorithms 826, and wiry object detection algorithms 828. Output of any of these algorithms can be further processed by other algorithms, as denoted in FIG. 8 by the bidirectional arrows. As a result of roof classification 822 and building modeling 830, one or more buildings 838 may be identified in the ground or nonground LIDAR data, or the data may be further processed, e.g., by the clutter removal algorithm 820 or the wall classification algorithm 824. Application of wall classification algorithm 824 may result in, for example, detection of a fence 832, or further processing of the LIDAR data by the roof classification 822 or the boxy object detection 826. Application of boxy object detection 826 may result in detection of, e.g., cars or a mailbox 834, or further processing of the LIDAR data by wall classification 824 or wiry object detection 828. Application of wiry object detection may detect poles, wires, etc. 836, or may result in further processing by boxy object detection 826.

Referring again to FIG. 7A, the illustrative context-free object identification module 726 performs context-free object identification with feature sharing, using the 2D and 3D features 724 extracted by the feature computation module 718. The context-free object identification module 726 uses features for joint learning of multiple classes, using feature sharing and context in the proto-object identification layer. This enables the system 100 to used limited exemplars and models for multi-class object recognition and for recognition in context. Classification with feature sharing can be performed using, e.g., an indexable database of joint features for a large database of objects such as vehicles. The context-free object identification module 726 utilizes multiple techniques to handle a large class of objects, including, for example: (1) automated learning of shared features amongst classes using a logarithmic number of features as a function of the number of classes; and (2) a visual vocabulary of feature prototypes to create clusters of similar classes for linear-in-number-of-classes complexity for learning.

Figure 9:
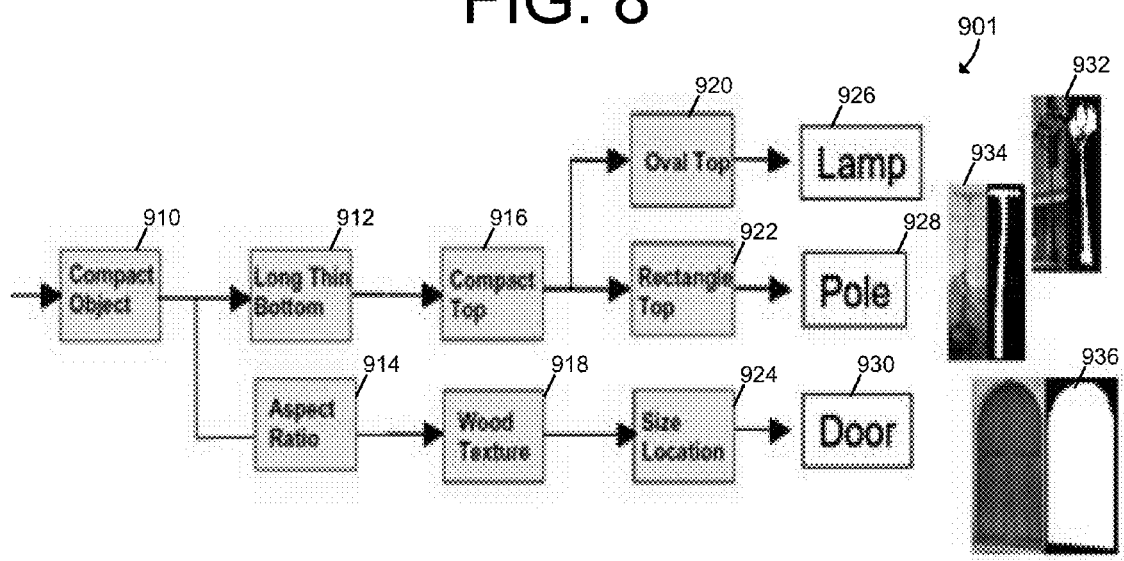
FIG. 9 is a simplified schematic diagram illustrating an example of context-free object identification with feature sharing, of at least one embodiment of the object/scene recognition and classification subsystem of FIG. 3.

FIG. 9 illustrates an example of how feature sharing amongst object classes may proceed (in the direction from left to right on the drawing). Images of a lamp post and a telephone pole have many similar features, while a door is distinctly different and does not share many features with the lamp post or the telephone pole. For instance, the feature 910, compact object, may be shared by all of the lamp post 932, telephone pole 934 and door 936 images. The features 912, 916, 922 may all be applicable to a pole 928, which could be either a telephone pole or a lamp post. However, the feature 920, oval top, is applicable to a lamp 926 but not to other types of poles. The features 914, 918, 924 are applicable to doors 930 but not poles 928 or lamps 926.

Figure 10:
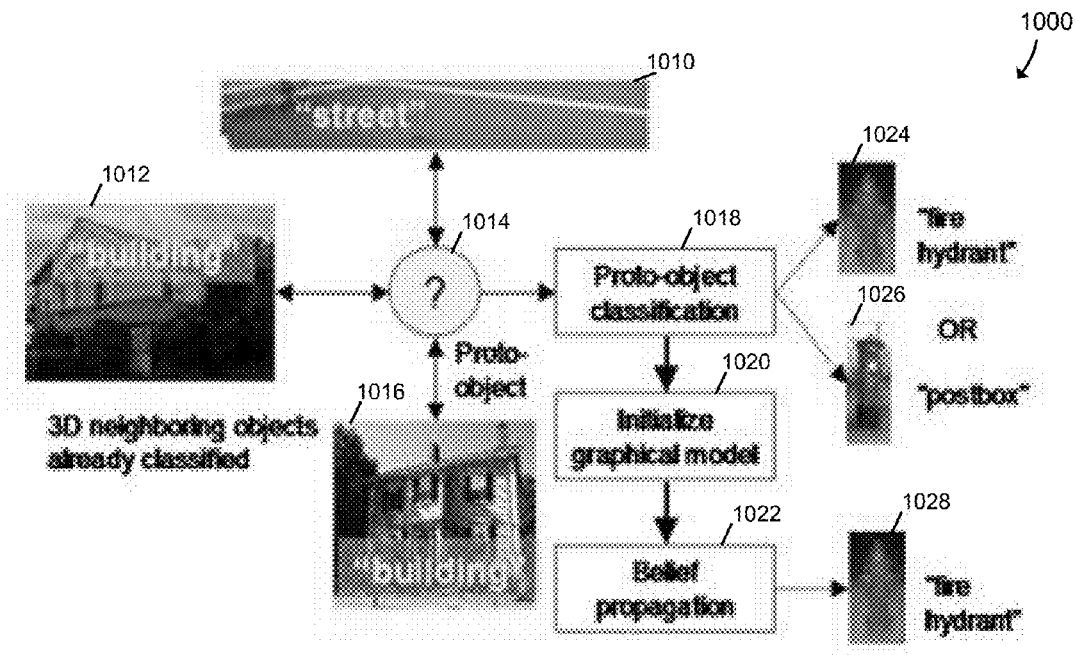
FIG. 10 is a simplified schematic diagram illustrating an example of contextual object identification and classification, of at least one embodiment of the object/scene recognition and classification subsystem of FIG. 3.
Figure 11:
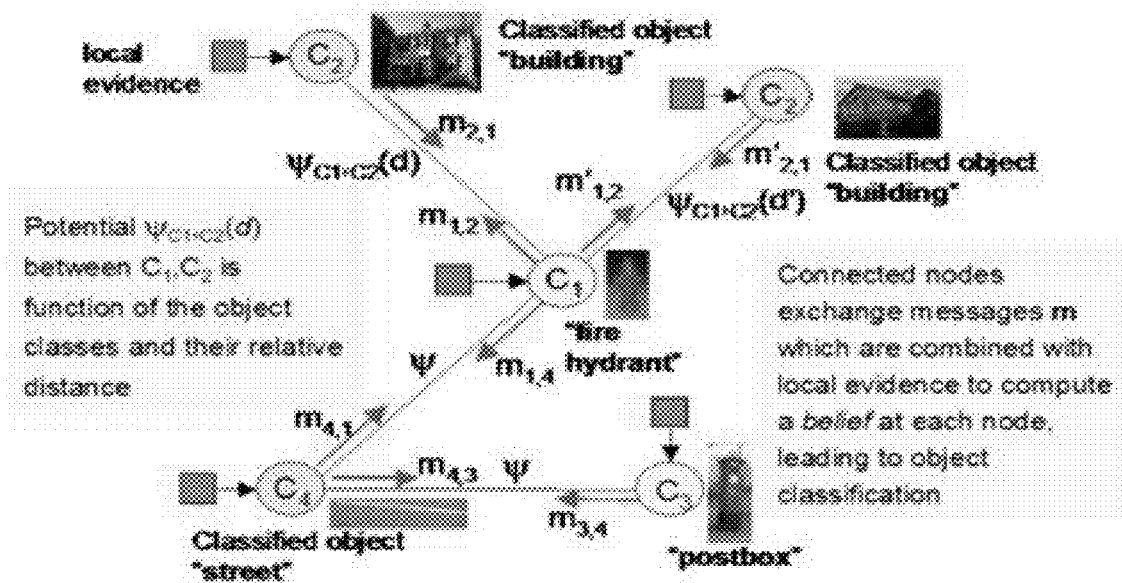
FIG. 11 is a simplified schematic diagram illustrating another example of contextual object identification and classification, of at least one embodiment of the object/scene recognition and classification subsystem of FIG. 3.

Referring again to FIG. 7A, the illustrative contextual object identification module 732 performs principled contextual inferencing. The principled approach to object classification is used with inter-class and spatial constraints expressed as graph models with belief propagation. This approach enables learning context both from examples as well as priors derived from generic world knowledge and human specified rules. FIG. 10 depicts an example 1000 of the use of context information and belief propagation to classify smaller-scale objects. Proto-object classification 1018 of objects depicted in images 1010, 1012, 1016 may identify an upright object as either a fire hydrant 1024 or a post box (mailbox) 1026. The proto-object classification is used to initialize a graphical model 1020, with which belief propagation 1022 is performed, resulting in a final object identification of fire hydrant 1028. The classification of "fire hydrant" may be based on, for example, 3D neighboring objects that have already been classified. For example, if the system 100 has already identified a building and a street, these object identifications can be used to influence the classification of the unknown object. FIG. 11 further illustrates the use of context information and belief propagation to classify objects based on the relationships of the objects to one other. In FIG. 11, the relative distances between the object classes (e.g., C1, C2, C3, C4) are used to compute a potential between each of the connected nodes. Connected nodes exchange messages m, which are combined with local evidence to compute a belief at each node. The computed belief leads to object classification.

In order to recognize some object or scene classes, such as an alley, or a factory, the recognition and classification subsystem 312 uses context for object extraction and identification. The interaction between object identification and extraction and bag-of-objects identification can be used to improve accuracy in object recognition. Graphical models can be used for the representation of context, and belief propagation can be used as a principled method for inferencing with context. Contextual inferencing can be extended to include classes that can be loosely represented as a bag-of-objects. These classes can represent complex objects, such as a mobile home park, a factory, or a railroad yard. The complex objects may be a conglomeration of object types arranged in flexible geometric relationships.

The illustrative recognition and classification subsystem 312 performs context-free object identification and contextual object identification iteratively. The context-free object identification module 726 generates object class hypotheses 728, which are used by the contextual object identification module 732 to produce context-based extracted objects 730, which are then fed back to the context-free object identification module 726.

Referring still to FIG. 7A, the illustrative complex object identification module 736 performs bag-of-objects identification techniques to identify complex objects. The context-free and contextual identification layers (performed by, e.g., the context-free object identification module 726 and the contextual object identification module 732) identify and extract objects typically in connected, compact regions of space. The next processing layer, performed by the complex object identification module 736, addresses the recognition of complex, extended object classes such as a golf course, processing plant, or mobile home park. These complex objects consist of a loose geometric configuration of other small objects, and are called bag-of-objects. For example, individual units of a mobile home park can be at various distances from each other. Embodiments of the complex object identification module 736 can employ the following types of features to identify and extract these complex objects: (i) textons, for characterizing texture and appearance in 3D and 2D date acquired mainly from the air. For example using textons large geographical areas can be characterized as being a grassy surface, forest, crop field, or an urban environments; (ii) "bag-of-objects" descriptors.

Bag-of-objects is akin to the popular bag-of-features descriptor used in computer vision and information retrieval for retrieving images, video and documents using histograms of visual words and textual words. Geometrical relationships between visual words are ignored with the idea that visual words are rich enough to capture class specific characteristics. The bag-of-objects descriptor is a histogram of object classes, which occur within an area. The descriptor does not capture the relationship between the objects, but can be used for recognizing semantic objects that have little or no constraints between the components such as a factory or feeding lot. In essence, the bag-of-objects descriptor captures the gist of regions within a scene, i.e., it specifies the individual content, but not the relationship between components; (iii) contextual bag-of-objects descriptor, which consists of concatenated bag-of-objects histograms of recognized small objects within regions centered at a 3D location. The contextual bag of objects provides more discrimination compared to the simpler, bag-of-objects feature, yet is flexible to configuration changes between the individual objects. For example, objects such as a gas station have a constrained spatial distribution between the objects (pumps occur at a certain distance from the building). The foregoing features, designed to capture the characteristics of complex objects, are employed in a classification framework that utilizes training data from annotated scenes as well as from pre-defined rules is used. The rules can be in the form of classes present as well as sketches of rough arrangements of classes.

Training and context learning are typically performed offline by the visual words computation module 738, the object classifier training module 740, and the contextual relationship determination module 742. The components of the offline functionality 703 develop multi-class classifiers learning classifiers with limited exemplars, e.g., classifiers that automatically and optimally share features across classes and can work with limited training examples. This approach can reduce error in classification by not committing to a labeling on a class-by-class basis but rather keeping hypotheses alive until more features from later layers lead to more specificity. The classifiers are constructed automatically and require limited training data. The classifiers naturally achieve generalization and robustness to intra-class variations. New classes can be incrementally added.

Figure 7B:
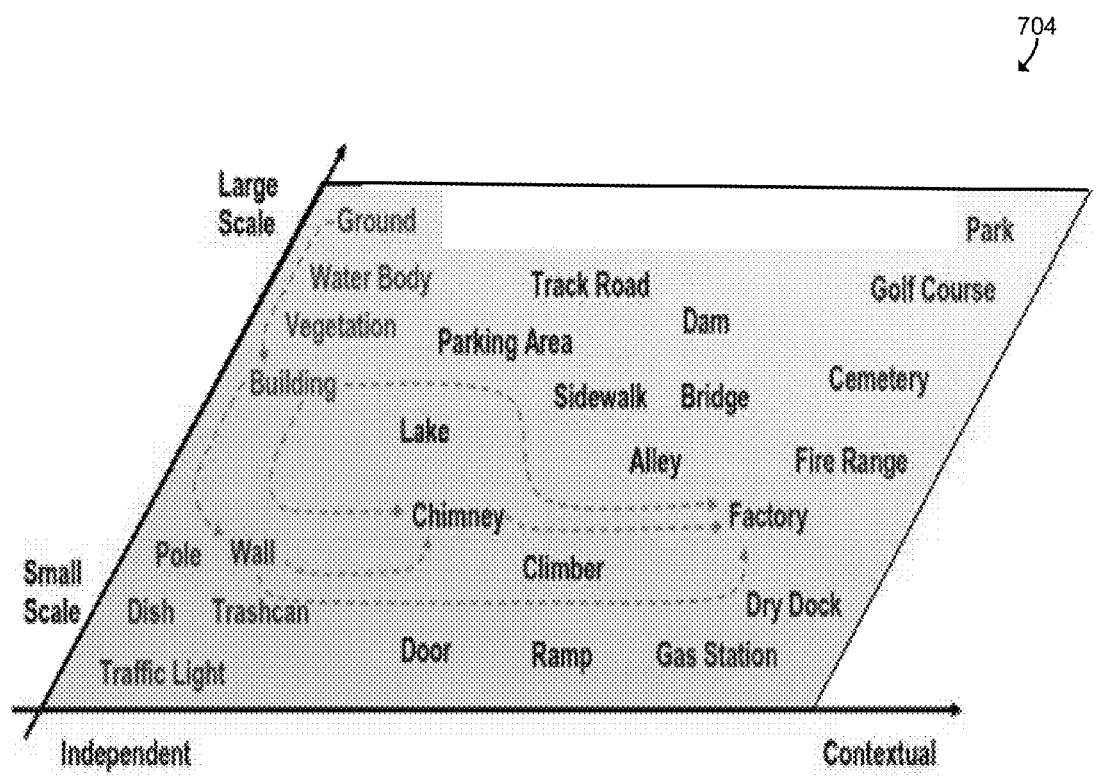
FIG. 7B is a simplified schematic diagram of an illustrative layered object recognition architecture of at least one embodiment of the object/scene recognition and classification subsystem of FIG. 3.

Referring now to FIG. 7B, an exemplary plot 704 illustrates the heterogeneity of object classes and the disclosed layered approach for exploiting that heterogeneity. The classes range (along the "y" axis) from smaller-scale objects, such as fire hydrants and trash-cans, to larger-scale objects, such as cranes and buildings, to complex objects, such as streets, golf courses and trailer parks. The objects are ranked along the context ("x") axis. Categories such as buildings, trees, and ground may be capable of being recognized with very little context while complex (e.g., compound) objects such as factories and golf courses may only be recognized by detecting the presence and co-location of a large number of smaller object classes (using, e.g., a bag-of-objects).

As noted above, principled contextual inferencing can be used to exploit scene context using the identity of objects within local spatial regions. For example, independently distinguishing small objects such as fire hydrants from other small objects, such as post boxes, may be difficult. However, context information relating them to larger, more salient objects may disambiguate the exact class identity of small objects, e.g., fire hydrants occur close to buildings. Contextual information is encoded as a graphical model where each node encapsulates the belief that the object belongs to a class. Belief propagation is used to refine and detect object classes.

Figure 16:
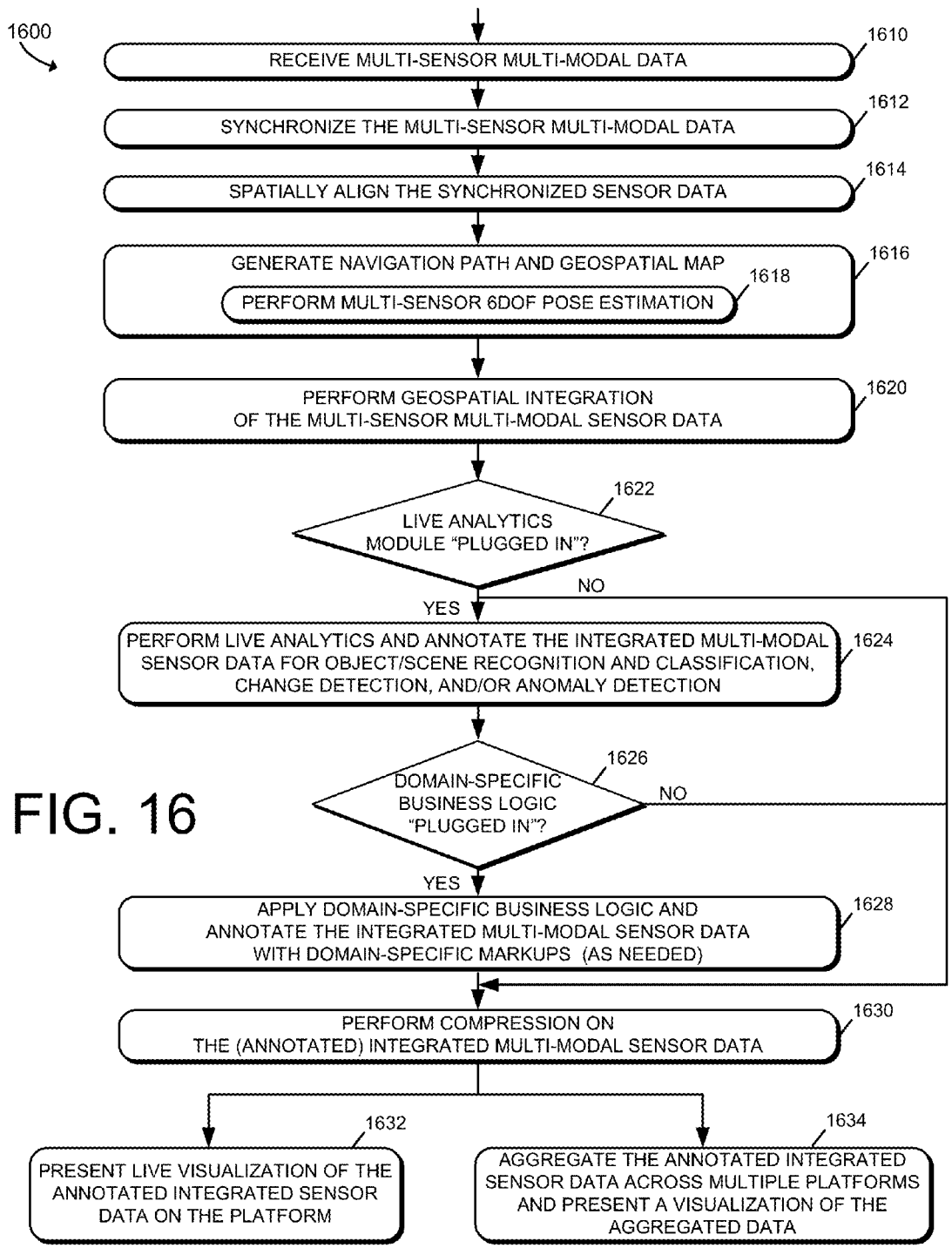
FIG. 16 is a simplified flow diagram of at least one embodiment of a process by which the computing system of FIG. 1 may perform collection, analysis, recognition, and visualization operations on multi-sensor, multi-modal data as disclosed herein.

Referring now to FIG. 16, an example of a process 1600 implemented as computer-readable instructions executed by the computing system 100 to perform multi-sensor, multi-modal 3D geospatial mapping, object recognition, scene annotation and analytics is shown. The process 1600 may be embodied as computerized programs, routines, logic and/or instructions executed by the platform 120 of the computing system 100, for example by one or more of the modules and other components of the platform 120 shown in FIGS. 1-6 and 7A, described above. At block 1610, the system 100 receives sensor data from the multiple, multi-modal sensors (e.g., sensor data 112, 114, 116 from sensors 102, 104, 106). In block 1612, the system 100 temporally aligns or synchronizes the various multi-modal data streams received in block 1620. In block 1614, the system spatially aligns the synchronized sensor data, using, e.g., spatial and geo-spatial association techniques. In block 1616, the system 100 generates a navigation path and geospatial map for the platform 120. To do this, the system 100 may perform multi-sensor 6DOF pose estimation in block 1618, using, e.g., an error-state extended Kalman filter as described above with reference to FIG. 6. In block 1620, the system 100 performs geospatial data integration of the multi-sensor multi-modal data (e.g., sensor data 112, 114, 116).

The data integration performed in block 1620 may result in an integrated map representation of the sensor data, which can be visualized or analyzed by, e.g., plug-in style analytics and/or business logic. In block 1622, the system 100 determines whether a live analytics module (e.g., a live analytics subsystem 134) is available. If no live analytics are available, the system proceeds to block 1630 to perform compression of the integrated sensor data for visualization and/or transmission to another device. If live analytics are available, the system 100 proceeds to block 1624. In block 1624, the system 100 performs live analytics on the integrated multi-modal sensor data and annotates the integrated multi-modal sensor data. To do this, the system performs object/scene recognition and classification, change detection, and/or anomaly detection algorithms to identify useful annotations, and adds the annotations to the map representation of the integrated multi-modal sensor data.

In block 1626, the system 100 determines whether any domain-specific business logic (e.g., a domain-specific data correlation module 136) is available. If no business logic is available, the system proceeds to block 1630 to perform compression of the integrated sensor data for visualization and/or transmission to another device. If business logic is available, the system 100 proceeds to block 1628. In block 1628, the system 100 executes the domain-specific business logic on the integrated multi-modal sensor data and annotates the integrated multi-modal sensor data with markups produced as a result of the application of the domain-specific business logic. To do this, the system may perform domain-specific object/scene recognition and classification, change detection, and/or anomaly detection algorithms to identify useful domain-specific markups, and adds the domain-specific markups to the map representation of the integrated multi-modal sensor data.

In block 1630, the system 100 creates a compressed version of the annotated and marked-up (as needed) map representation of the integrated multi-modal sensor data. To do this, the system 100 may employ one or more of the approaches described above with reference to FIGS. 4 and 14-15. Following the data compression performed in block

1630, the system 100 may proceed to block 1632 and/or block 1634. In block 1632, the system 100 presents a live visualization of the annotated (and marked up, as needed) integrated multi-modal sensor data locally, e.g. on the platform 120. In block 1634, the system 100 aggregates the locally produced annotated sensor data with similar data produced by other platforms 120, and presents a visualization of the aggregated data on a display device. This data aggregation and visualization of the aggregated data may be performed on the local platform or on another computing device, such as a ground-based command center or mobile device.

Referring now to FIG. 17, an example of a process 1700 implemented as computer-readable instructions executed by the computing system 100 to perform object recognition and classification is shown. The process 1700 may be embodied as computerized programs, routines, logic and/or instructions executed by the computing system 100, for example by one or more of the modules and other components of the computing system 100 shown in FIGS. 1-6 and 7A, described above. The illustrative process 1700 includes steps or subprocesses contained in box 1702 that can execute concurrently, e.g., by multiple processors, as described below with reference to FIG. 18. The process 1700 also includes steps or subprocesses contained in box 1712, which can execute iteratively.

At block 1710, the system 100 performs large-scale and/or proto-object recognition on the visual imagery captured by, e.g., 2D and/or 3D image sensors coupled to or integrated with the computing system 100. To do this, the system 100 may utilize any of the techniques described above with reference to the extraction module 710 of FIG. 7A. In block 1714, the system 100 performs context-free object identification using the large-scale object and/or proto-object information generated in block 1710. To do this, the system 100 may utilize any of the techniques described above with reference to the context-free object identification module 726 of FIG. 7A. In block 1716, the system 100 performs contextual object identification (e.g., contextual inferencing) utilizing the object identification information generated in block 1714. The system 100 may iterate between blocks 1714, 1716 to further classify smaller-scale objects detected within the large-scale or proto-object areas detected in block 1710. In block 1718, the system 100 utilizes the smaller-scale object identification information produced by block 1716 and/or block 1714 to perform complex object recognition. To do this, the system 100 may utilize a bag-of-objects algorithm as described above with reference to the complex object identification module 736 of FIG. 7A. The resulting output of the process 1700 can be used in the generation of a map representation for, e.g., the platform 120 or for further analysis (including change detection and/or anomaly detection as described above).

EXAMPLE USAGE SCENARIOS

Many various applications of the multi-sensor multi-modal data collection, analysis, recognition, and visualization technologies disclosed herein are possible, including applications addressed to automated collection and analysis of geospatial data for facility monitoring, asset protection, and monitoring or surveillance of natural resources (e.g., water supplies, agricultural properties, forests, etc.) or man-made structures, including public utility networks (e.g., electric, gas, oil, water, cable), dams, levees, roads, bridges, tunnels, etc.

Figure 18:
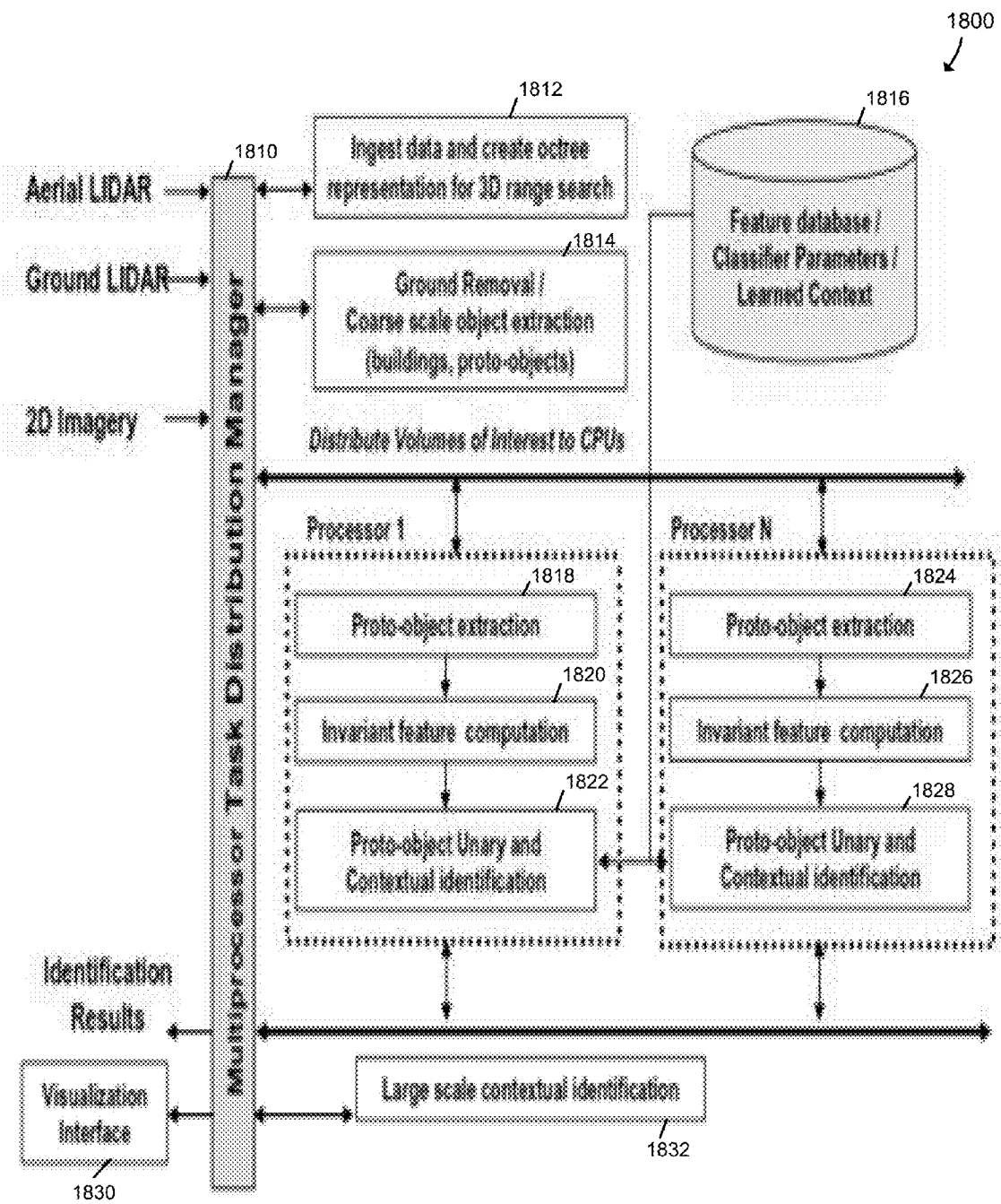
FIG. 18 is a simplified schematic diagram of at least one embodiment of a real time multi-processor computing system for performing scene analytics as disclosed herein.

In one implementation, the data representation, compression, and visualization modules were assessed qualitatively and quantitatively using data collected by a multi-sensor rig mounted on a Segway RMP (model=200). Evaluation was performed using two different sensor configurations that reflect common operational configurations for ground robots. Both configurations used LIDAR sensors paired with stereo cameras and a low-cost MEMS IMU. The cameras and IMU form a navigation solution that can provide reliable 6-DOF pose in GPS-enabled or GPS-denied environments. The first sensor configuration paired a single laser scanning LIDAR (the Hokuyo UTM-LTX), mounted coronally on a rotary stage that repeats a constant velocity 180 degree pan behavior, thus collecting a 360 degree point cloud with full hemispheric field-of-view. The Hokuyo sensor receives range measurements, in the form of line scans with 1081 samples (0.25 degree angular resolution), at 40 Hz. The second sensor configuration used the Velodyne HDL-32e, a multi-laser LIDAR that has been extensively used for autonomous vehicles in the last decade. The sensor was mounted rigidly with the same stereo camera set and IMU as in the Hokuyo configuration. The Velodyne HDL-32e spins at 5 Hz and collects range and intensity values from 32 lasers, thus sampling a 360 degree field of view. For both configurations, the raw LIDAR range values were integrated into a global coordinate frame using real-time pose estimates obtained from an extended Kalman filter that integrates IMU measurements with visual odometry. To aid in drift correction, incoming 3D point clouds were aligned to previously accumulated patches via real-time ICP (iterative closest point), thus feeding back drift corrections to the 6DOF vision-based localization. To evaluate the system, data was collected from several outdoor environments with a mix of trees, buildings, vehicles, etc. The data sequences are 5 to 20 minutes long and contain up to 0.5 billion points. The data was processed in packets of 3000 points at a time and the compression statistics and performance times were aggregated across all sequences for the same sensor. The streaming framework was implemented in C++ and uses an octree class derived from the base class in Point Cloud Library. Tests were performed on a laptop with an i7 processor. The compression rate was evaluated at a high (lossless) and low (lossy) resolution. The Hokuyo sensor was tested with 1 cm and 4 cm voxel size, and the Velodyne sensor was tested with 4 cm and 8 cm voxel size. The normals were computed at the 4 cm voxel octree depth and using a search radius of 30 cm with a maximum of 20 nearest neighbors. The normals were encoded with 11 bits per voxel. Results are shown in FIGS. 18, 19 and 20 of the aforementioned U.S. Provisional Application Ser. No. 61/954,635.

In another configuration, a ground vehicle is equipped with multiple sensors including LIDAR, EO, IR (infrared) and multi-spectral sensors. These sensors are used to construct multi-modal 3D maps of the environment. A navigation module on the vehicle precisely locates and orients the vehicle in geo-spatial coordinates using data from GPS, IMU, odometer, compass and camera based sensors. The 3D pose estimated by the navigation module is used to stitch together the LIDAR data to generate 3D map data. 3D swath data can be further matched to improve the 3D alignment. Final estimates of these poses allow highly accurate map layer with all modalities of data co-located in geo-spatial coordinates.

A multi-modal change detection module (e.g., change detection module 310) enables comparing the captured multi-modal 3D to previous collects by aligning the two data sets automatically. Anomalous changes are automatically detected and flagged for future examination by an analyst. Current environment conditions are used to infer if the change is due to environmental conditions e.g. different temperatures or natural illumination at the two collects or if it is truly a real change based on the business rules of the application.

In another configuration, an aerial vehicle is equipped with multiple sensors including LIDAR, EO, and IR sensors. These sensors are used to construct multi-modal 3D maps of the environment. A navigation module on the aerial vehicle precisely locates and orients the vehicle in geo-spatial coordinates using data from GPS, IMU, air-data, compass and camera based sensors. The 3D pose estimated by the navigation module is used to stitch together the LIDAR data with the EO, and IR data and geo-spatial reference terrain data of the earth. A multi-modal change detection module enables comparing the captured multi-modal 3D to previous collects by aligning the two data sets automatically. Anomalous changes are automatically detected and flagged for future examination by an analyst.

For some applications, multi-sensor data collected from the air and ground platforms can be combined to build an integrated multi-modal 3D map of the environment. The combination is typically be done by aligning the two data sets. The alignment may be done at the pixel or voxel level by matching 2D and 3D point clouds collected from the air and ground. Alternatively, the alignment can be done at the semantic level, where high level features and objects such as roads, buildings, poles etc. are detected in each of the ground and aerial collects and then their detected locations are used to match the two data sets. Analytics and change detection can be performed on either the combined or separate aerial and ground collects and then fused together.

Implementation Examples

Referring now to FIG. 18, an exemplary implementation 1800 of the computing system 100 utilizes a commercial off-the-shelf (COTS) multi-processing computing platform. As described above, scalable methods for processing large amounts of data for performing 3D modeling and 3D object classification using LIDAR and EO data acquired by both aerial and ground sensors can be used. In particular, terabytes of aerial LIDAR data can be processed using an off-the-shelf dual-quad core desktop computer for performing LIDAR-based 3D object classification (ground extraction, vegetation clutter removal and 3D building segmentation), automatic 2D-3D registration for texturing 3D models, for geospatial areas in the range of thousands of square kilometers. The scalability of the object recognition is provided by partitioning the input LIDAR/EO data into tiles, which can be individually processed across multiple CPUs as shown in FIG. 18. This data level parallelization ensures a high degree of scalability of the processing with minimal scripting language required (e.g., bash under Cygwin in the case of the Windows operating system).

The illustrative system architecture of the implementation 1800 includes a multiprocessor task distribution manager 1810, which handles the distribution of the sensor data from the various sensors (e.g., aerial LIDAR, ground LIDAR, 2D imagery) to processing modules 1812 (data ingestion and octree representation creation) and 1814 (large-scale/proto-object extraction), distributes volumes of interest across multiple CPUs (e.g., processor 1, processor N, where N is a positive integer), and handles large scale contextual identification 1832. Each of the processors 1, N, can handle the object recognition and classification tasks, e.g., proto-object extraction 1818, 1824; invariant feature computation 1820, 1826, proto-object unary and contextual identification 1822, 1828). The multiprocessor task distribution manager 1810 also oversees the output of identification results and map representations to the visualization interface 1830 and accesses and updates to/from the data stores including a feature database, classifier parameters, and/or learned context data.

The task distribution manager 1810 has the role of communicating with individual algorithmic components and to assign tasks to each of the processors using, e.g., the Message Passing Interface (MPI) protocol available both on Windows and Unix platforms. The system 1800 can use an octree data structure to ensure an efficient memory usage over large terrain areas and to access data at different resolution levels. After ground removal, buildings and proto-objects are extracted at a coarse scale and each volume of interest (VOI) is sent to be further processed on multiple processors (e.g., processors 1 to N). Within each processor, proto-objects are extracted at finer resolution, and invariant features in 3D and 2D are computed for classification. The feature computation and the classification are the most computationally intensive modules and offer a high degree of data level parallelization. In the last stage, the object classification results are collected from all the nodes to find large semantic structures using the bag-of-objects approach.

Referring now to FIG. 19, a simplified block diagram of an embodiment 1900 of the real-time multi-modal 3D geo-spatial mapping, object recognition, scene annotation, analytics, and visualization computing system 100 is shown. While the illustrative embodiment 1900 is shown as involving multiple components and devices, it should be understood that the computing system 100 may constitute a single computing device, alone or in combination with other devices. The embodiment 1900 includes a sensor computing device 1910, which embodies features and functionality of the multi-sensor data collection, analysis, recognition, and visualization computing system 100 (e.g., the sensors 102, 104, 106 and the platform 120), shown in FIG. 1, a data aggregation computing device 1970, which embodies features and functionality of the multi-platform data aggregation subsystem 148 shown in FIG. 1, and a user computing device 1950, which embodies features and functionality of the crowd sourcing app 152 shown in FIG. 1. The embodiment 1900 includes multiple additional sensor computing devices 1940, 1942, each of which may be embodied in a similar manner as the sensor computing device 1910. Each or any of the computing devices 1910, 1940, 1942, 1950, 1970 may be in communication with one another via one or more networks or other types of communication links, 1960.

The computing system 1900 or portions thereof may be distributed across multiple computing devices that are connected to the network(s) 1960 as shown. In other embodiments, however, the computing system 1900 may be located entirely on, for example, the sensor computing device 1910 or one of the devices 1950, 1970. In some embodiments, portions of the system 1900 may be incorporated into other systems or computer applications (e.g. as a plugin). Such applications or systems may include, for example, operating system software or GIS applications. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The illustrative sensor computing device 1910 includes at least one processor 1912 (e.g. a microprocessor, microcontroller, digital signal processor, etc.), memory 1914, and an input/output (I/O) subsystem 1916. The sensor computing device 1910 may be embodied as any type of computing device capable of performing the functions described herein, such as a mobile robot, a navigation-capable electronic device, an unmanned or unpiloted aerial or ground vehicle, a personal computer (e.g.,. desktop, laptop, tablet, smart phone, body-mounted device, wearable device, etc.), a smart appliance, a server, an enterprise computer system, a network of computers, a combination of computers and other electronic devices, or other electronic devices. Although not specifically shown, it should be understood that the I/O subsystem 1916 typically includes, among other things, an I/O controller, a memory controller, and one or more I/O ports. The processor 1912 and the I/O subsystem 1916 are communicatively coupled to the memory 1914. The memory 1914 may be embodied as any type of suitable computer memory device (e.g., volatile memory such as various forms of random access memory).

The I/O subsystem 1916 is communicatively coupled to a number of hardware and/or software components, including the components of the system 100 shown in FIGS. 1-6 and 7A, a data storage device 1918, a number of sensors 1930, a user interface (UI) subsystem 1932, and a communication subsystem 1934. The sensors 1930 may include one or more cameras (e.g., 2D and/or 3D still and/or video cameras), as well as other types of sensors such as IMUs, accelerometers, gyroscopes, GPS receivers, LIDAR systems, and/or others. As used herein, a "camera" may refer to any type of 2D or 3D image sensor or other device that is capable of acquiring and recording two-dimensional (2D) or three-dimensional (3D) video images of portions of the real-world environment, and may include cameras with one or more fixed camera parameters and/or cameras having one or more variable parameters, fixed-location cameras (such as "standoff" cameras that are installed in walls or ceilings), and/or mobile cameras (such as cameras that are integrated with consumer electronic devices, such as laptop computers, smart phones, tablet computers, wearable electronic devices and/or others.

The user interface subsystem 1932 includes one or more user input devices (e.g., a touchscreen, keyboard, virtual keypad, microphone, etc.) and one or more output devices (e.g., speakers, display devices, LEDs, etc.). The user interface subsystem 1932 may include devices such as a touchscreen display, a touch-sensitive keypad, a kinetic sensor and/or other gesture-detecting device, an eye-tracking sensor, and/or other devices that are capable of detecting human interactions with a computing device.

The devices 1950, 1970 are illustrated in FIG. 7 as being in communication with the sensor computing device 1910 and/or other devices 1940, 1942 by the network/communication links 1960. It should be understood that any or all of the devices 1940, 1942, 1950, 1970 may be integrated with the sensor computing device 1910 or embodied as a separate component.

The I/O subsystem 1916 is communicatively coupled to components of the multi-sensor data collection, analysis, recognition, and visualization platform 120 described above, one or more data storage devices (e.g., machine readable storage media) 1918, a user interface (UI) subsystem 1932, and a communication subsystem 1934. The storage media 1918 may include one or more hard drives or other suitable data storage devices (e.g., flash memory, memory cards, memory sticks, and/or others). In some embodiments, portions of the computing system 1900, e.g., the platform 120, and/or other data and components, reside at least temporarily in the storage media 1918. Portions of the computing system 1900, e.g., portions of the platform 120, may be copied to the memory 1914 during operation of the computing device 1910, for faster processing or other reasons.

The communication subsystem 1934 communicatively couples the sensor computing device 1910 to one or more other devices, systems, or communication networks, e.g., a local area network, wide area network, personal cloud, enterprise cloud, public cloud, and/or the Internet, for example. Accordingly, the communication subsystem 1934 may include one or more wired or wireless network interface software, firmware, or hardware, for example, as may be needed pursuant to the specifications and/or design of the particular embodiment of the system 1900.

The user computing device 1950 and the data aggregation computing device 1970 each may be embodied as any suitable type of computing device or personal electronic device capable of performing the functions described herein, such as any of the aforementioned types of devices or other electronic devices. The illustrative user computing device 1950 and data aggregation computing device 1970 each include components having the same or similar names to components of the sensor computing device 1910, described above, and accordingly, those components of the computing devices 1950, 1970 may be embodied similarly. Further, each of the devices 1910, 1940, 1942, 1950, 1970 may include components similar to those described above, and the computing system 1900 may include other components, sub-components, and devices not illustrated in FIG. 19. In general, the components of the computing system 1900 are communicatively coupled as shown in FIG. 19 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a navigation-capable vehicle includes one or more processors, and, in communication with the one or more processors: a two-dimensional image sensor; a three-dimensional image sensor; one or more sensors to determine motion, location, and orientation of the navigation-capable vehicle; and one or more non-transitory machine accessible storage media including instructions to cause the navigation-capable vehicle to: temporally and spatially align sensor data received from the two-dimensional sensor, the three-dimensional sensor, and the one or more motion, location, and orientation sensors; generate a map representation of a real world environment in a frame of reference of the navigation-capable vehicle based on the temporally and spatially aligned sensor data; recognize a plurality of visual features in the map representation using one or more computer vision algorithms; and annotate one or more of the visual features in accordance with domain-specific business logic.

An example 2 includes the subject matter of example 1, including instructions to cause the navigation-capable vehicle to present a visualization of the annotated visual features on the navigation-capable vehicle. An example 3 includes the subject matter of example 1 or example 2, including instructions to cause the navigation-capable vehicle to estimate a navigation path for the navigation-capable vehicle. An example 4 includes the subject matter of any of examples 1-3, including instructions to cause the navigation-capable vehicle to estimate a navigation path for the navigation-capable vehicle. An example 5 includes the subject matter of any of examples 1-4, including instructions to cause the navigation-capable vehicle to algorithmically detect changes in the visual features of the map representation over time. An example 6 includes the subject matter of example 5, including instructions to cause the navigation-capable vehicle to transmit data indicative of the detected changes to a ground-based computing device in real time. An example 7 includes the subject matter of example 5 or example 6, wherein the domain-specific business logic is to cause the navigation-capable vehicle to detect a change in a visual feature of a physical component of a ground-based utility service. An example 8 includes the subject matter of any of examples 5-7, wherein the domain-specific business logic is to cause the navigation-capable vehicle to detect a change in a visual feature of a natural resource. An example 9 includes the subject matter of any of examples 5-8, wherein the domain-specific business logic is to cause the navigation-capable vehicle to detect a change in a visual feature of a man-made physical structure. An example 10 includes the subject matter of any of examples 1-9, wherein the navigation-capable vehicle includes an unmanned aerial vehicle.

In an example 11, a multi-sensor data collection, analysis, recognition, and visualization platform includes instructions embodied in one or more non-transitory computer readable storage media and executable by one or more processors to cause a navigation-capable vehicle to: receive sensor data from a plurality of sensors including a two dimensional image sensor, a three-dimensional image sensor, and one or more sensors to determine motion, location, and orientation of the navigation-capable vehicle; temporally and spatially align the sensor data received from the two-dimensional sensor, the three-dimensional sensor, and the one or more motion, location, and orientation sensors; generate a map representation of the real world surroundings of the navigation-capable vehicle based on the temporally and spatially aligned sensor data; recognize a plurality of visual features in the map representation by executing one or more computer vision algorithms; annotate one or more of the visual features in accordance with domain-specific business logic; and present a visualization of the annotated visual features on the navigation-capable vehicle.

An example 12 includes the subject matter of example 11, including instructions to cause the navigation-capable vehicle to present the visualization of the annotated visual features on the navigation-capable vehicle in real time. An example 13 includes the subject matter of example 11 or example 12, including instructions to cause the navigation-capable vehicle to transmit the visualization of the annotated visual features to a ground-based computing device in real time. An example 14 includes the subject matter of any of examples 11-13, wherein the domain-specific business logic includes a change detection algorithm to detect one or more domain-specific changes in the visual features over time, and the platform includes instructions to annotate the visual features to identify the detected domain-specific changes on the visualization. An example 15 includes the subject matter of any of examples 11-14, wherein the domain-specific business logic includes an anomaly detection algorithm to detect one or more domain-specific anomalies in the visual features over time, and the platform includes instructions to annotate the visual features to identify the detected domain-specific anomalies on the visualization.

In an example 16, a system for multi-sensor data collection, analysis, recognition, and visualization by a navigation-capable vehicle, the system including one or more computing devices configured to: temporally and spatially align data received from a two-dimensional sensor, a three-dimensional sensor, and one or more motion, location, and orientation sensors; generate a map representation of the real world surroundings of the navigation-capable vehicle based on the temporally and spatially aligned sensor data; recognize a plurality of visual features in the map representation by executing one or more computer vision algorithms; estimate a navigation path for the navigation-capable vehicle; annotate one or more of the visual features in accordance with domain-specific business logic; and present a visualization of the annotated visual features on the navigation-capable vehicle.

An example 17 includes the subject matter of example 16, configured to interactively modify the visualization of the annotated visual features in response to user input. An example 18 includes the subject matter of example 16 or example 17, configured to tag one or more of the annotated visual features in the visualization in response to user input. An example 19 includes the subject matter of any of examples 16-18, configured to execute domain-specific anomaly detection logic on the visual features and annotate the visualization based on the execution of the domain-specific anomaly detection logic. An example 20 includes the subject matter of any of examples 16-19, configured to execute domain-specific change detection logic on the visual features and annotate the visualization based on the execution of the domain-specific change detection logic.

In an example 21, a mobile computing device includes one or more processors, and, in communication with the one or more processors: one or more image sensors configured to obtain two-dimensional image data and three-dimensional image data; one or more non-transitory machine accessible storage media including instructions to cause the mobile computing device to: temporally and spatially align the two-dimensional image data and three-dimensional image data; generate a map representation of a geo-spatial area of the real world surroundings of the mobile computing device based on the temporally and spatially aligned two-dimensional and three-dimensional image data; and recognize a plurality of visual features in the map representation, using one or more computer vision algorithms to: recognize larger-scale objects; recognize smaller-scale objects by iteratively performing context-free object identification and contextual object identification; and recognize a complex object including a plurality of the smaller-scale objects, using a classifier.

An example 22 includes the subject matter of example 21, including instructions to cause the mobile computing device to detect the larger-scale objects by determining a contextual frame of reference, and use the contextual frame of reference to identify the larger-scale objects. An example 23 includes the subject matter of example 21 or example 22, including instructions to cause the mobile computing device to recognize the larger-scale objects by executing an invariant three-dimensional feature detection algorithm directly on point cloud data obtained from at least one of the image sensors. An example 24 includes the subject matter of example 23, including instructions to cause the mobile computing device to recognize the larger-scale objects by executing an invariant two-dimensional feature detection algorithm. An example 25 includes the subject matter of any of examples 21-24, including instructions to cause the mobile computing device to recognize the larger-scale objects by executing an invariant two-dimensional feature detection algorithm. An example 26 includes the subject matter of any of examples 21-25, including instructions to cause the mobile computing device to recognize the smaller-scale objects by executing a context-free feature-sharing algorithm. An example 27 includes the subject matter of example 26, including instructions to cause the mobile computing device to recognize the smaller-scale objects by obtaining context information and classifying the smaller-scale objects based on the context information. An example 28 includes the subject matter of example 26 or example 27, including instructions to cause the mobile computing device to recognize the complex objects by executing a contextual bag of objects algorithm.

In an example 29, an object/scene recognition system includes instructions embodied in one or more non-transitory computer readable storage media to and executable by one or more processors to cause a mobile computing device to: obtain two-dimensional image data and three-dimensional image data from one or more image sensors; temporally and spatially align the two-dimensional image data and three-dimensional image data; recognize a plurality of visual features in the image data, using one or more computer vision algorithms to: recognize larger-scale objects; recognize smaller-scale objects by iteratively performing context-free object identification and contextual object identification; and recognize a complex object including a plurality of the recognized smaller-scale objects, using a classifier.

An example 30 includes the subject matter of example 29, including instructions to cause the mobile computing device to detect the larger-scale objects by determining a contextual frame of reference and use the contextual frame of reference to identify the larger-scale objects. An example 31 includes the subject matter of example 29 or example 30, including instructions to cause the mobile computing device to recognize the larger-scale objects by executing an invariant three-dimensional feature detection algorithm directly on point cloud data obtained from at least one of the image sensors. An example 32 includes the subject matter of example 31, including instructions to cause the mobile computing device to recognize the larger-scale objects by executing an invariant two-dimensional feature detection algorithm. An example 33 includes the subject matter of any of examples 29-32, including instructions to cause the mobile computing device to recognize the larger-scale objects by executing an invariant two-dimensional feature detection algorithm. An example 34 includes the subject matter of example 30, including instructions to cause the mobile computing device to recognize the smaller-scale objects by executing a context-free feature-sharing algorithm. An example 35 includes the subject matter of example 34, including instructions to cause the mobile computing device to recognize the smaller-scale objects by obtaining context information and classifying the smaller-scale objects based on the context information. An example 36 includes the subject matter of example 34 or example 35, including instructions to cause the mobile computing device to recognize the complex objects by executing a contextual bag of objects algorithm.

In an example 37, an object/scene recognition method includes, with one or more mobile computing devices: obtaining two-dimensional image data and three-dimensional image data from one or more image sensors; temporally and spatially aligning the two-dimensional image data and the three-dimensional image data; and recognizing a plurality of visual features in the image data by: recognizing larger-scale objects; recognizing smaller-scale objects by iteratively performing context-free object identification and contextual object identification; and recognizing a complex object including a plurality of the smaller-scale objects using a classifier.

An example 38 includes the subject matter of example 37, including determining a contextual frame of reference and using the contextual frame of reference to identify the larger-scale objects. An example 39 includes the subject matter of example 37 or example 38, including executing an invariant three-dimensional feature detection algorithm directly on point cloud data obtained from at least one of the image sensors. An example 40 includes the subject matter of example 38, including, iteratively: executing a context-free feature-sharing algorithm to recognize the smaller-scale objects, obtaining context information, and classifying the smaller-scale objects based on the context information.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A mobile computing device, comprising:
   one or more processors, and, in communication with the one or more processors:
   one or more image sensors configured to obtain two-dimensional image data and three-dimensional image data;
   one or more non-transitory machine accessible storage media comprising instructions to cause the mobile computing device to:
   temporally and spatially align the two-dimensional image data and three-dimensional image data;
   generate a map representation of a geo-spatial area of the real world surroundings of the mobile computing device based on the temporally and spatially aligned two-dimensional and three-dimensional image data; and
   recognize a plurality of visual features in the map representation, using one or more computer vision algorithms to:
   recognize larger-scale objects;
   recognize smaller-scale objects by iteratively performing context-free object identification and contextual object identification; and
   recognize a complex object comprising a plurality of the smaller-scale objects, using a classifier.

2. The mobile computing device of claim 1, comprising instructions to cause the mobile computing device to detect the larger-scale objects by determining a contextual frame of reference, and use the contextual frame of reference to identify the larger-scale objects.

3. The mobile computing device of claim 1, comprising instructions to cause the mobile computing device to recognize the larger-scale objects by executing an invariant three-dimensional feature detection algorithm directly on point cloud data obtained from at least one of the image sensors.

4. The mobile computing device of claim 3, comprising instructions to cause the mobile computing device to recognize the larger-scale objects by executing an invariant two-dimensional feature detection algorithm.

5. The mobile computing device of claim 1, comprising instructions to cause the mobile computing device to recognize the larger-scale objects by executing an invariant two-dimensional feature detection algorithm.

6. The mobile computing device of claim 2, comprising instructions to cause the mobile computing device to recognize the smaller-scale objects by executing a context-free feature-sharing algorithm.

7. The mobile computing device of claim 6, comprising instructions to cause the mobile computing device to recognize the smaller-scale objects by obtaining context information and classifying the smaller-scale objects based on the context information.

8. The mobile computing device of claim 6, comprising instructions to cause the mobile computing device to recognize the complex objects by executing a contextual bag of objects algorithm.

9. An object/scene recognition system comprising instructions embodied in one or more non-transitory computer readable storage media to and executable by one or more processors to cause a mobile computing device to:
   obtain two-dimensional image data and three-dimensional image data from one or more image sensors;
   temporally and spatially align the two-dimensional image data and three-dimensional image data;
   recognize a plurality of visual features in the image data, using one or more computer vision algorithms to:
   recognize larger-scale objects;
   recognize smaller-scale objects by iteratively performing context-free object identification and contextual object identification; and
   recognize a complex object comprising a plurality of the recognized smaller-scale objects, using a classifier.

10. The system of claim 9, comprising instructions to cause the mobile computing device to detect the larger-scale objects by determining a contextual frame of reference and use the contextual frame of reference to identify the larger-scale objects.

11. The system of claim 9, comprising instructions to cause the mobile computing device to recognize the larger-scale objects by executing an invariant three-dimensional feature detection algorithm directly on point cloud data obtained from at least one of the image sensors.

12. The system of claim 11, comprising instructions to cause the mobile computing device to recognize the larger-scale objects by executing an invariant two-dimensional feature detection algorithm.

13. The system of claim 9, comprising instructions to cause the mobile computing device to recognize the larger-scale objects by executing an invariant two-dimensional feature detection algorithm.

14. The system of claim 10, comprising instructions to cause the mobile computing device to recognize the smaller-scale objects by executing a context-free feature-sharing algorithm.

15. The mobile computing device of claim 14, comprising instructions to cause the mobile computing device to recognize the smaller-scale objects by obtaining context information and classifying the smaller-scale objects based on the context information.

16. The mobile computing device of claim 14, comprising instructions to cause the mobile computing device to recognize the complex objects by executing a contextual bag of objects algorithm.

17. An object/scene recognition method comprising, with one or more mobile computing devices:
   obtaining two-dimensional image data and three-dimensional image data from one or more image sensors;
   temporally and spatially aligning the two-dimensional image data and the three-dimensional image data; and
   recognizing a plurality of visual features in the image data by:
   recognizing larger-scale objects;
   recognizing smaller-scale objects by iteratively performing context-free object identification and contextual object identification; and
   recognizing a complex object comprising a plurality of the smaller-scale objects using a classifier.

18. The method of claim 17, comprising determining a contextual frame of reference and using the contextual frame of reference to identify the larger-scale objects.

19. The method of claim 17, comprising executing an invariant three-dimensional feature detection algorithm directly on point cloud data obtained from at least one of the image sensors.

20. The method of claim 18, comprising, iteratively: executing a context-free feature-sharing algorithm to recognize the smaller-scale objects, obtaining context information, and classifying the smaller-scale objects based on the context information.

* * * * *